US006693625B2

(12) United States Patent
Armstrong

(10) Patent No.: US 6,693,625 B2
(45) Date of Patent: Feb. 17, 2004

(54) CONTROLLER WITH VARIABLE SENSOR(S)

(76) Inventor: Brad A. Armstrong, P.O. 2048, Carson City, NV (US) 89702

(*) Notice: Subject to any disclaimer, the term of this patent is extended or adjusted under 35 U.S.C. 154(b) by 161 days.

(21) Appl. No.: 09/941,310

(22) Filed: Aug. 29, 2001

(65) Prior Publication Data

US 2002/0024503 A1 Feb. 28, 2002

Related U.S. Application Data

(63) Continuation of application No. 09/253,263, filed on Feb. 19, 1999, now Pat. No. 6,285,356, and a continuation-in-part of application No. 08/677,378, filed on Jul. 5, 1996, now Pat. No. 6,222,525, and a continuation-in-part of application No. 09/148,806, filed on Sep. 4, 1998, now Pat. No. 6,208,271, and a continuation-in-part of application No. 09/122,269, filed on Jul. 24, 1998, now Pat. No. 6,135,886, and a continuation-in-part of application No. 08/942,450, filed on Oct. 1, 1997, now Pat. No. 6,102,802, and a continuation-in-part of application No. 09/106,825, filed on Jun. 29, 1998, now Pat. No. 5,999,084, and a continuation-in-part of application No. 07/847,619, filed on Mar. 5, 1992, now Pat. No. 5,589,828, and a continuation-in-part of application No. 08/393,459, filed on Feb. 23, 1995, now Pat. No. 5,565,891.

(51) Int. Cl.[7] .................................................. G06T 3/00
(52) U.S. Cl. ...................................................... 345/161
(58) Field of Search ................................ 345/158, 160, 345/161, 167

(56) References Cited

U.S. PATENT DOCUMENTS 4,680,577 A * 7/1987 Straayer et al. ............. 345/160
5,689,285 A * 11/1997 Asher ......................... 345/161

* cited by examiner

*Primary Examiner*—Almis R. Jankus

(57) ABSTRACT

An input device such as a joystick, which utilizes a plurality of individual analog compression-sensitive sensors for detecting direction and magnitude of applied force, such as applied to an arm. The arm is supported to allow substantial radial displacement outward from a resting to a maximum allowed position. The analog sensors are positioned within a compression applicator moveable to apply compression thereto. Resilient structuring is incorporated to provide, once compressing of a sensor starts, substantial disproportionate movement of the arm relative to the moveable compression component. The resilient structuring includes resistance to further deflection in order to increase force to a sensor as the arm is further displaced toward the maximum allowed displacement. The arm, resilient member and moveable component of the compression applicator are integrally molded as one piece of plastics in one embodiment.

9 Claims, 10 Drawing Sheets

CONTROLLER WITH VARIABLE SENSOR(S)

CROSS-REFERENCE TO RELATED APPLICATIONS/PATENTS

This application is continuation or possibly a continuation-in-part of U.S. patent application No. 09/253,263 filed Feb. 19, 1999, now U.S. Pat. No. 6,285,356 (to be filled in later). This application is also a continuation-in-part of each of my U.S. patents: Ser. No. 08/677,378 filed Jul. 5, 1996 U.S. Pat. No. 6,222,525; Ser. No. 09/148,506 filed Sep. 4, 1998 U.S. Pat. No. 6,208,271; Ser. No. 09/122,269 filed Jul. 24, 1998 U.S. Pat. No. 6,135,886; Ser. No. 09/942,450 filed Oct. 1, 1997 U.S. Pat. No. 6,102,802; Ser. No. 09/106,825 filed Jun. 29, 1998 U.S. Pat. No. 5,999,084; Ser. No. 07/847 filed Mar. 5, 1992 U.S. Pat. No. 5,589,828; U.S. Pat. No. 5,565,891 Ser. No. 07/847,619 filed Feb. 23, 1995 and my U.S. patent application Ser. No. 09/721,090, now U.S. Pat. No. 6,310,606. A benefit under 35 USC 120 is claimed to the above patents/applications.

BACKGROUND OF THE INVENTION

1. Field of the Invention

The present invention relates to displacement to electrical manipulation joystick type controllers or controllers which include joystick members useful for computer, game console and machinery control for example.

2. Description of the Related Prior Art

Prior art displacement to electrical manipulation joysticks have been manufactured and sold in large numbers over the last several decades. Such prior art joysticks include expensive rotary sensors such as potentiometers or optical encoders, or Hall effect, magnetic sensors or the like for detecting force applied to a handle, and commonly provide for a significant amount of displacement capability of the handle. The terms handle, rod, stick and arm as used in reference to the main riser of joysticks are herein to be generally interchangeable and are intended to apply to the manipulable elongated lever to which an actuating force is applied, such as by a human hand or finger, to affect a control signal.

Many consumers have grown accustomed to the significant handle displacement capabilities and resultant conventional feel and ease of control of such joysticks. Additionally, many users perceive the accuracy of displacement joysticks as being high due to the high displacement capabilities. Many consumers, being accustomed to conventionally feeling displacement joysticks, desire significant displacement capabilities in a joystick, particularly but not limited to when the joystick is used for electronic game control. Consumers are generally unconcerned as to the type of force or movement detecting sensors utilized in a joystick provided the joystick functions well for their purposes. However, consumers are concerned about the purchase price of a joystick, the accuracy and durability thereof, and how the joystick feels during use.

In recent years, prior art joysticks have been developed which utilize variably conductive compression-sensitive material connected in circuitry to affect electricity in the circuit in an analog manner, usually with varying resistance, the resistance varied based on the magnitude of compressive force received by the material. The small size of such compression-sensitive sensors allows such joysticks to be manufactured in a small size, and thus joysticks using such sensors are often designed for cooperative attachment to and use with computer keyboards wherein the arm (lever) extends upward between the adjacent keys of the keyboard to be exposed to force applied by a human finger. In such an arrangement, the keys are quite close to the arm of the joystick and thereby present a situation suitable for use of a joystick having an arm greatly restricted against user detectable displacement of the arm. While such joysticks with very little if any user detectable arm displacement capabilities may be suitable for use mounted in a keyboard with the arm extending upward between keys, such joysticks are unsatisfactory in many other applications, again, because many consumers have grown accustomed to being able to substantially displace the arm of conventional joysticks, and believe such displacement leads to increased accuracy in desired control. Additionally, many believe high displacement of the arm leads to greater enjoyment, particularly when playing certain types of electronic games.

To my knowledge, the compression-sensitive material used as the active component of the compression-sensitive variable-conductance sensors in such joysticks is quite hard, even though it is sometimes called "conductive rubber" due to its typical silicone rubber content. While the material is technically physically compressible in thickness, its ability to reduce in thickness under compression applied by a typical joystick is very limited because the material is fairly hard and generally un-compressible in a joystick.

Examples of typical prior art joysticks which utilize pressure or compression-sensitive sensors for detecting force applied to the arm and which aid in providing analog information related to the direction and magnitude of the applied force are discussed below.

U.S. Pat. No. 5,659,334 issued Aug. 19, 1997 to S. Yaniger et al, and U.S. Pat. No. 5,828,363 issued Oct. 27, 1998 to S. Yaniger et al each disclose force-sensing pointer devices in the form of joysticks which utilize pressure-sensitive sensors, the joysticks being primarily directed for use in computer keyboards with the arm of the devices extending upward from between the keys. The Yaniger et al arms, being apparently of rigid construction, are rigidly secured at the bottom end to an apparently rigid plate referred to as a force transfer member and which applies force to the sensors. Force against the upper end of the arm of the Yaniger joysticks is transferred through the lower force transfer member and into the sensors. Applied force to the Yaniger arm forces the force transfer member into the sensors, and the sensors are supported against moving away from the force transfer member, thus, when the sensors provide resistance to the force transfer member being displaced, which is generally immediate, resistance against the arm being displaced is also thereby immediately provided since the arm and force transfer member are rigidly and proportionately linked to one another. The arms of the Yaniger et al joysticks are substantially prohibited from any appreciable displacement which the user could feel, and this for numerous structural and use application reasons, but probably the most important applicable reason is the desires of Yaniger et at to intentionally build such joysticks wherein the tip or upper end of the sticks have a maximum travel distance "close or equal to zero." which they believe is ergonomically correct.

European patent application number 94102739.3, publication number 0 616 298 A1 filed Feb. 23, 1994 by inventor Okada Hiroyasu, discloses a joystick type device primarily intended for use in a computer keyboard and which uses pressure sensitive sensors (compression-sensitive variable resistance material) and includes an arm or lever fastened to or resting against a pressing plate, the pressing plate a component for compressing the sensor material such as against a circuit board or the like backing member. With force applied to the Okada Hiroyasu lever, the lever is shown to be inclined by a given angle, and the pressing plate is also shown to be inclined by the same given angle, and thus proportionantly inclined relative to the lever. The Okada Hiroyasu lever has very little displacement capability, and the pressing plate moves proportionantly with the lever.

U.S. Pat. No. 5,689,285 issued Nov. 18, 1997 to D. J. Asher describes a joystick which utilizes a multi-layered membrane sensor. The membrane sensor includes first and second insulating substrates; first and second resistors in the form of closed loops on the respective insulating substrates; a layer of pressure-sensitive resistive material interposed between the resistors, and an actuator including a shaft for transferring force vectors applied to the shaft into the membrane sensor lamination to create signals which after complex computation can be treated as representative of direction and magnitude of the force. The membrane sensor of Asher is relatively expensive, particularly when or if it is interfaced with a conventional style rigid circuit board typically used to support microcontrollers and other electronic components used in joysticks.

other prior art considered pertinent to this disclosure are described below.

U.S. Pat. No. 5,805,138 issued Sep. 8, 1998, and assigned to IBM Corp. describes a gross motion input controller of very large size and which includes a surface for a user to sit on, and a spring mounted riser member having a plurality of tension-actuated and expensive strain gages mounted inside the riser tube for sensing motion.

U.S. Pat. No. 5,831,596 issued Nov. 3, 1998 to S. Marshall et al discloses a joystick including a resilient control arm for providing a more acceptable feel to a user of the joystick. The Marshall et al joystick does not use pressure or compression sensitive sensors, but instead utilizes relatively expensive Hall effect or magnetic type sensors which detect displacement of the control arm.

U.S. Pat. No. 4,514,600 issued Apr. 30, 1985 by inventor J. M. Lentz describes a video game hand controller in joystick style which includes a switch assembly including a helical coil spring extending from the area of the switch assembly in a housing into the exposed handle of the unit, the helical spring being bendable with force applied to the stick, the bending causing the spring to make contact with one or more electrical contact pads disposed concentrically around the spring. The spring is electrically conductive and connected to the controller circuitry to serve as one electrical lead of each of the switches. The contact pads produce video game control signals through a normally open, momentary closing of an On/Off switch-like arrangement incapable of producing analog information.

U.S. Pat. No. 4,349,708 issued Sep. 14, 1982 by inventor J. C. Asher describes a joystick including a deformable resilient annular member superimposed over normally open, momentary-On contact switches so that displacement of the handle of the joystick causes an arcuate portion of the annular member to press against at least one of the switches at a time to cause closing thereof. The switches are activated depending on the direction of displacement of the handle. Displacement of the Asher annular member toward a momentary-On switch appears to be proportionate to the displacement of the handle in the same direction, and the switches and associated circuitry are not analog capable.

U.S. Pat. No. 5,835,977 issued Nov. 10, 1998 describes a joystick using strain gauge sensors affected by tension, with the post (stick or arm) intentionally structured and supported to have very little displacement capability so as to prevent the excessive stretching and thus damage to the strain gauges. In one embodiment, the post is restrained by an auxiliary post restrainer device in the form of a tube located about the post, with adjustable bolts mounted in the tube and positioned to abut and greatly restrain displacement of the post.

A prior art gimbal using joystick is currently on the market in the U.S. and is made by CH Products of San Marcos, Calif., USA, and is sold under the trade name of "Flightstick Pro"While the "Flightstick Pro" uses a gimbal; a highly displaceable lever arm connected to rotate two axles; and includes a post member on each axle which abuts arms, the post, arms and tension spring connected across the arms of the "Flightstick Pro" are only for return-to-center of the lever arm. The "Flightstick Pro" utilizes expensive rotary potentiometers as sensors, one per axle, and requires user adjustable centering wheels to be adjusted by the user at the start of play to center the object controlled by the potentiometers. The "Flightstick Pro" does not use compression-sensitive variable-conductance (CSVC) material or CSVC sensors.

Other relevant documents describing prior art joysticks cumulative to the above prior art are: U.S. Pat. Nos. 4,408,103; 5,749,577; 5,767,840; 5,510,812, and German patent DE19519941 published Mar. 13, 1997 and European patent EP0438919 published Jul. 31, 1991.

U.S. Pat. No. 3,806,471 issued Apr. 23, 1974 to R. J. Mitchell is relevant to the structuring and operation of compression-sensitive variable-conductance material and sensors using such material to manipulate electricity in circuitry.

Also, the prior art of record in the U.S. patent application Ser. No. 09/253,263 now U.S. Pat. No. 6,285,356 (to be filled in later), as well as the prior art of record in all of the above mentioned earlier patents of mine of which this is a continuation-in-part should be reviewed.

SUMMARY OF THE INVENTION

Herein incorporated by reference are the specifications and drawings of my U.S. Pat. Nos. 6,222,525; 6,208,271; 6,135,886; 6,102,802; 5,999,084; 5,589,828; 5,565,891; and my pending U.S. patent application Ser. Nos. 09/721,090 and 09/253,263 for the positive teachings therein. U.S. Pat. No. 6,222,525 is incorporated at least in part for, and not exclusively for the teachings and aspects therein of dome-cap using analog output sensors which provide a break-over threshold tactile feedback; sheet(s) connecting to the sensors, and active tactile feedback, i.e., a motor, shaft and offset mounted weight for making a vibration or the like feedback to the user of the game or image controller as is taught in my earlier incorporated U.S. Pat. No. 5,589,828. Useful pivotally mounted buttons associated with the sensors outputting an analog signal are also taught in U.S. Pat. No. 6,222,525. My U.S. Pat. No. 6,102,802 is incorporated at least in part for, and not exclusively for the teachings and aspects therein of a two hand held handle or hand graspable housing having left-hand and a right-hand sides, an analog sensor or sensors with a dome-cap on the right-hand side and including a multi-axes input member such as a rocker pad or the like in the left-hand side, among other features such as the dome-caps including soft snap or threshold tactile feedback as elaborated on in my U.S. Pat. Nos. 5,999,084 and 6,135,886.

The present invention, at least from one of several possible viewpoints, is a joystick type displacement to electrical manipulation controller useful for function control of electronic games associated with game consoles and computers, and computer control of electronic pointers and other electronic/graphical aspects associated with computers, computer and game programs, software and machines, and displays, i.e., monitors, televisions, CRTs and the like.

The present joystick, which includes a radially and highly displaceable arm, utilizes compressive-sensitive variable-conductance materials located in circuitry and circuit elements as variable sensors for detecting force applied to the displaceable arm and for producing analog information (signals) related to magnitude (amount) of the force applied to the arm. Multiple independent compressive-sensitive variable-conductance sensors located in relationship to orthogonal X and Y axes are used to provide additional information indicative of the direction of force applied to the displaceable arm. A preferred joystick includes at least four individual compression-sensitive variable-conductance sensors spaced 90 degrees apart for providing information pertaining to the direction and magnitude of the force applied to the displaceable arm relative to orthogonal X and Y axes. The analog information is converted to digital information for most applications, and is preferably output in USB "Universal Serial Bus" compliant data for use with PC computers.

The present joystick provides for substantial arm displacement to render a "conventional feel" to the human user of the joystick, and is structured such that the compression-sensitive variable sensors detect force applied to displace the arm generally immediately upon moving the arm from a center electrical null resting position, so as to feel both accurate and sensitive to the user.

In accordance with the invention, strategically located resilient material forms part of a physical linkage, or is otherwise within a physical compression force transfer path, between the arm and a member of a compression applicator. The compression applicator is structured to produce compressive movement to compress against the compression-sensitive variable-conductance material of the sensors when the arm is displaced. The resilient material allows the arm to be radially displaced to a degree which is clearly and readily user discernable with the compression-sensitive variable sensors detecting the force causing the arm displacement and affecting the output of electrical information or output representational of direction of such displacement and the magnitude of force applied to displace the arm.

In one arrangement in accordance with the invention, the compression applicator includes a stiff backing member and a slightly moveable force applicator member between which is located four (or more) spaced apart compression-sensitive variable-conductance sensors so as to be compressed by movement (rotation) of the slightly moveable force applicator member toward the backing member. The backing member can advantageously be a circuit board with circuit traces and proximal circuit element pairs thereon positioned relative to the compression-sensitive variable-conductance material. The slightly moveable force applicator member can advantageously be a tiltable plate extending in multiple directions laterally relative to a lengthwise axis of the displaceable arm. The strategically located resilient material is part of a linkage arrangement which links displacement in the arm to some displacement in the slightly moveable force applicator member of the compression applicator, the linkage of the displacement being disproportionate so that displacement of the arm can be substantial and equivalent (or greater) to "conventional joysticks", while the resultant rotating displacement of the slightly moveable force applicator member in a sensor-compressing movement against one or more of the variable sensors is less and disproportionate to the displacement of the arm. In other words, displacement of the arm equal to X degrees results in rotating or tilting displacement of the slightly moveable force applicator member less than X degrees in compressive movement against the compression-sensitive material (variable sensor). Another way to state it is that the compressive movement of the compression applicator is less than the movement (displacement) of the arm, and disproportionatly less.

Resilient structuring or material, preferably the same resilient material or member used to give disproportionate displacement between the arm and moveable member of the compression applicator, is applied to move the arm from a displaced location back to the center electrical null resting position upon withdrawal of the displacing force.

Embodiments in accordance with the invention as herein described can be made with the extending arm connected to a tiltable-plate overlaying multiple compression or variable sensors and serving as the slightly moveable force applicator member of the compression applicator. Alternatively, the present joystick can be made using a gimbal with rotary axles carrying posts for engaging and rotating pairs of actuating arms relative to adjacently mounted compression-sensitive variable-conductance sensors, a sensor for detecting each rotational direction of the axles, wherein rotation of the actuating arms toward an adjacent sensor is attenuated by a resilient member, such as a tension spring having an increasing resistance to further flexing as it is increasing flexed or stretched in order to increase compression of the sensor as the extending arm (joystick main arm) is increasingly rotated outward further from the resting center null position.

A joystick in accordance with the invention can be manufactured inexpensively due to a low number of required parts and the low cost of the compressive-sensitive sensors, and can be manufactured with a high level of durability due to a low number of moving parts required.

A joystick in accordance with the invention can be manufactured in a wide variety of sizes including very small units. The small sizes can be sufficiently small to be operated by a single finger or thumb and mounted in a hand held game controller (gamepad or the like) or a computer keyboard or the like. Larger size units can be sized to allow grasping the joystick arm by hand, such as in stand alone desk top type joysticks. If desired, the compression-sensitive variable-conductance sensors can be structured to have a tactile feedback to the user.

Other preferred features of the preferred joysticks herein detailed include a handle mounted on or being a part of the arm and bi-directionally rotatable about a Z axis (yaw), the rotation direction and magnitude of the rotational force being detected by a novel arrangement of compression-sensitive variable-conductance sensors, the output of which, if desired, can be processed and also output as USB compliant data such as to be readily usable by a modern PC computer having a USB port.

Novel methodology pertaining to the manufacturing of a joystick in accordance with the invention is also herein disclosed.

These, and other objects and advantages of the present invention will become increasingly appreciated with continued reading and with a review of the drawings.

BEST MODES FOR CARRYING OUT THE INVENTION

In elaboration of the above details regarding the invention and with specific reference to the included drawings, preferred structures and best modes for carrying out the invention will now be described in detail. The details are provided to allow those skilled in the art to both build and use at least one structural embodiment in accordance with the invention without having to resort to a high level of experimentation, however, many changes in the details, i.e. structures and methods, can be made without departing from the true invention, as those skilled in the art will recognize upon a review of this disclosure.

In reference firstly to joystick embodiment 10 primarily of FIGS. 1–7. Joystick embodiment 10, like the other joysticks in accordance with the invention, includes an electrical power source or input which could be batteries or brought in through a multi-conductor wired cord 12 connection for powering electrical components of the joystick. Additionally, joystick 10, like the other joysticks in accordance with the invention, includes a communication link for communicating information with a device or the electronics thereof to be at least in-part controlled by the joystick, the communication link being through conductive wires such as in wired cord 12 or a wireless link or any other suitable communication link. Wired cord 12 having multiple conductors in this example is shown connected to circuit board 14 in FIG. 1.

Figure 1:
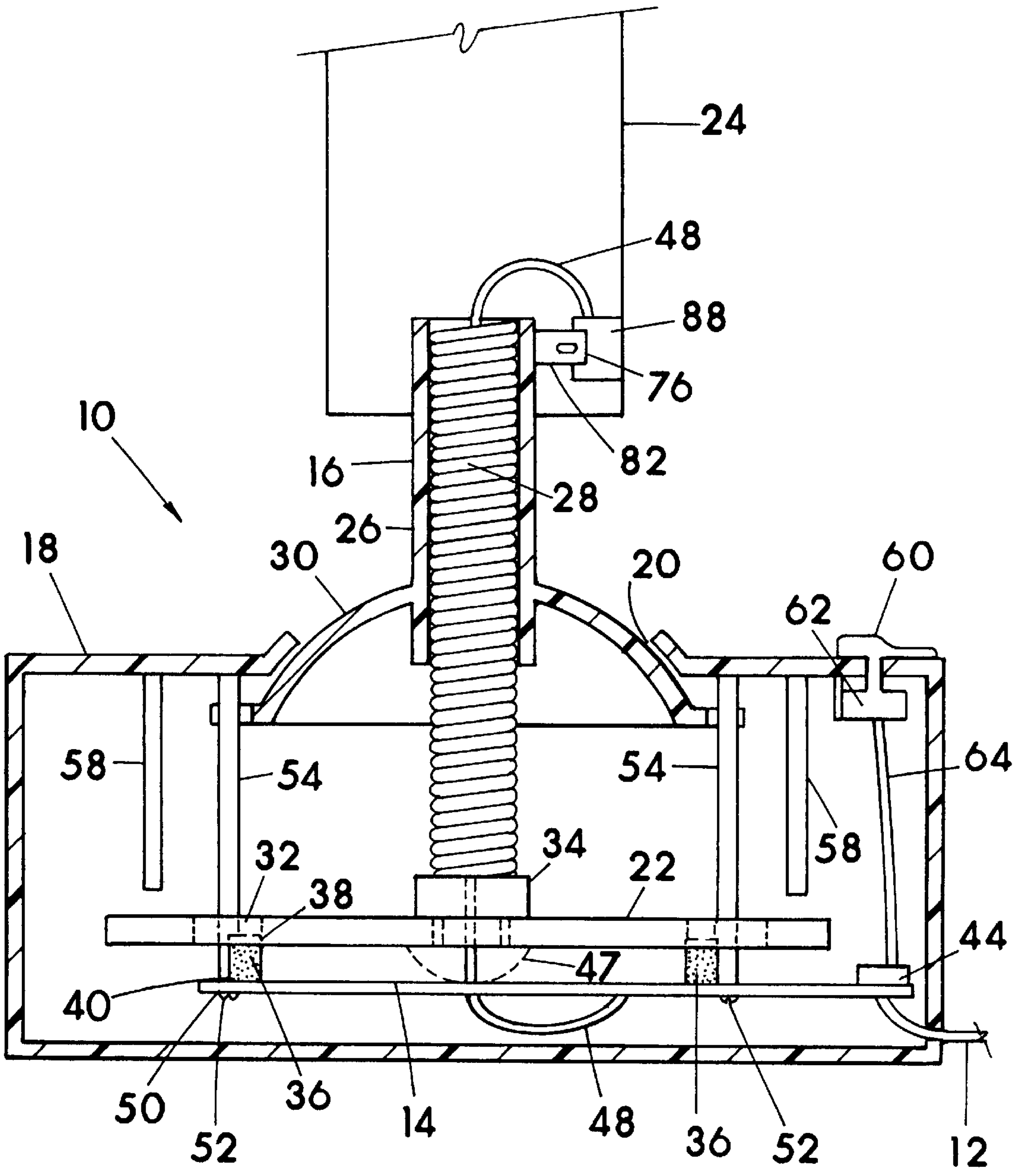
FIG. 1 is a side view of a first embodiment of joystick in accordance with the present invention, and with a portion of the base or housing cut-away.

FIG. 1 shows joystick 10 in which extending arm 16 has a first end or lower end within confines of a housing or base 18 and extending through an opening 20 in base 18 to have a second or upper end positioned external of base 18. A lower end of arm 16 is shown within base 18 and attached to or engaged with force applicator member 22 of a sensor compression applicator. Housing or base 18 can be a conventional stand alone style structure similar to many prior art joystick bases or housings, or it can be a portion of a console of some type, a keyboard housing, or the housing of a hand-held game control peripheral, and provides some mechanical protection to parts of the joystick which should not normally be contacted by the hand, and base 18 further supplies rigid and stationary surfaces to which to mount components of the joystick, such as to mount circuit board 14 shown in FIG. 1. and to aid in supporting arm 16.

Arm 16 is moveable or displaceable radially preferably in at least four directions with respect to an axis through the length of the arm from a normal resting position of the arm 16. The displacement of arm 16 is brought about by way of force being applied to an upper region of arm 16, upper meaning further away from base 18. The upper region of arm 16 against which force is applied, such as by a human hand, foot or finger, can be handle 24 on or as a component of arm 16 as in FIG. 1, a tubular sleeve or stem 26 as a component of arm 16 and absent handle 24, or the upper end of spring 28 (resilient member) which when left bare and exposed above base 18 would define arm 16. In joystick embodiment 10, arm 16 can be considered to be spring 28 alone, or spring 28 with stem 26, or spring 28 with stem 26 and handle 24 mounted on stem 26, or arm 16 can be spring 28 with a handle or knob structure mounted directly thereto without the use of stem 26 or an equivalent member.

Figure 7:
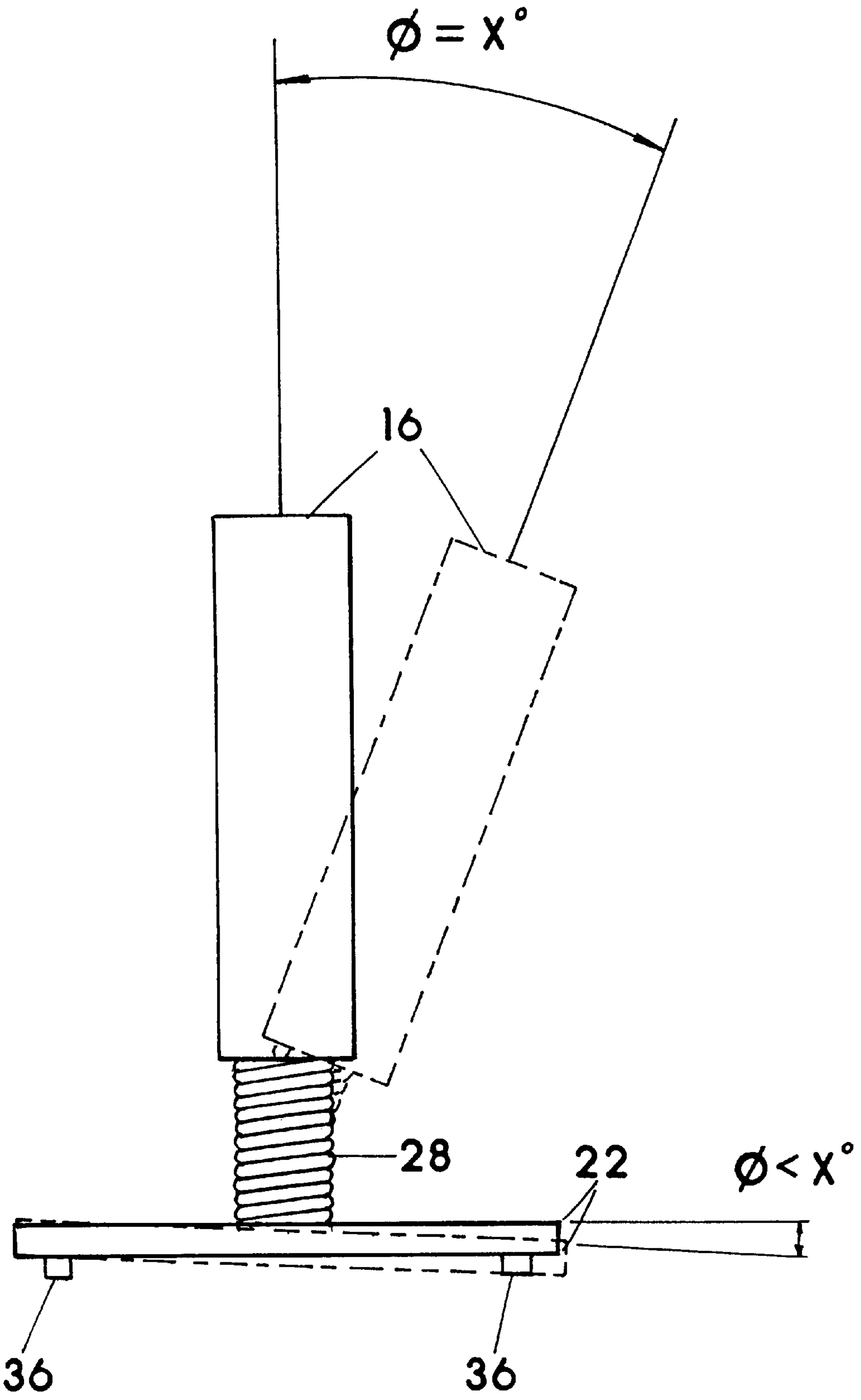
FIG. 7 shows an arm and slightly moveable force applicator member in resting positions in solid lines, and in tilted positions in broken lines to illustrate one arrangement of disproportionality in displacement for use with compression-sensitive variable-conductance sensors which use firm variable-conductance material.

Spring 28, which is shown as a helical coiled tension type metal spring in FIG. 1, but could be a resilient rod made of elastomeric material or the like, bends from its normal resting position when force is applied thereto, and returns due to inherent resiliency when the force is removed. The bending of spring 28 results in the upper region of arm 16 being displaced more than the lower region of the arm nearer or within base 18 due to supporting and some restraining of the lower end of arm 16 within base 18 (to be detailed), and so in embodiment 10 the upper end of arm 16 is highly displaceable as indicated in FIG. 7. Arm 16 displaced from a resting position by way of bending in some area of the arm is herein considered tiltably displaced or displaceable. The bending in arm 16 can be entirely unseen, such as when stem 26 is applied over the upper portion, wherein the bending portion of the spring 28 or arm 16 occurs within the confines of base 18 and allowing the upper end of arm 16 to angle (tilt) relative to its normal resting position.

FIG. 1 shows arm 16 comprising spring 28 with tubular stem 26 covering a portion of the spring 28. Also shown is a lower portion of grippable handle 24 attached to stem 26. Stem 26 is shown with a semi-spherical structure 30 molded on the lower end thereof positioned under material defining opening 20 in base 18 and serves in combination with opening 20 as a ball-like component with opening 20 serving as a socket-like component wherein a swivel joint is defined. The semi-spherical structure 30 can rotate in a swiveling manner with stem 26 (spring arm 16 and handle 24 when used) but cannot escape through opening 20, and as will be detailed is restrained against axial rotation. With the upper end of spring 28 engaged to stem 26, spring 28 is prevented from escaping and moving upward through opening 20, but is radially moveable with stem 26. The material defining base 18 surrounding opening 20 can be positioned such that stem 26 (arm 16) when tilted to a maximum tilt is prevented from further tilting by abutting the material surrounding opening 20.

In the FIG. 1 example, arm 16 is an elongate member extending with its lengthwise axis outward from opening 20 in base 18, passing through the opening, to provide a member or object against which force can be applied, such as by being exposed so as to be engagable by a finger, foot or hand. The use of grippable handle 24 is preferred in some application wherein the joystick as a whole can be larger, such as when a desk top free standing joystick unit. Handle 24 provides structuring allowing the mounting of sensors and associated actuator arms therein for allowing rotation of the handle about the axis of the arm 16 in what is known as yaw, as was earlier mentioned and to be further detailed later below.

As previously mentioned, arm 16 can be substantially tiltably displaced relative to the resting position, and I prefer a minimum of about 10 degrees of displacement capability for most style or types of arm 16 from its resting position, as this provides a fairly conventional feel relative to the prior art joysticks which provide high displacement. The feel of the tilt angle or displacement is however somewhat dependant upon the length of the arm 16 above base 18, wherein arm 16 when 8 inches long and grasped at the upper end and fully displaced, say 15 degrees from resting, feels differently than if arm 16 were only 2 inches long and grasped at the upper end and displaced the same 15 degrees from the resting position. The upper or exposed portion of arm 16 can readily be made to tilt far more than the stated 10 degree preferred minimum capability.

Figure 2:
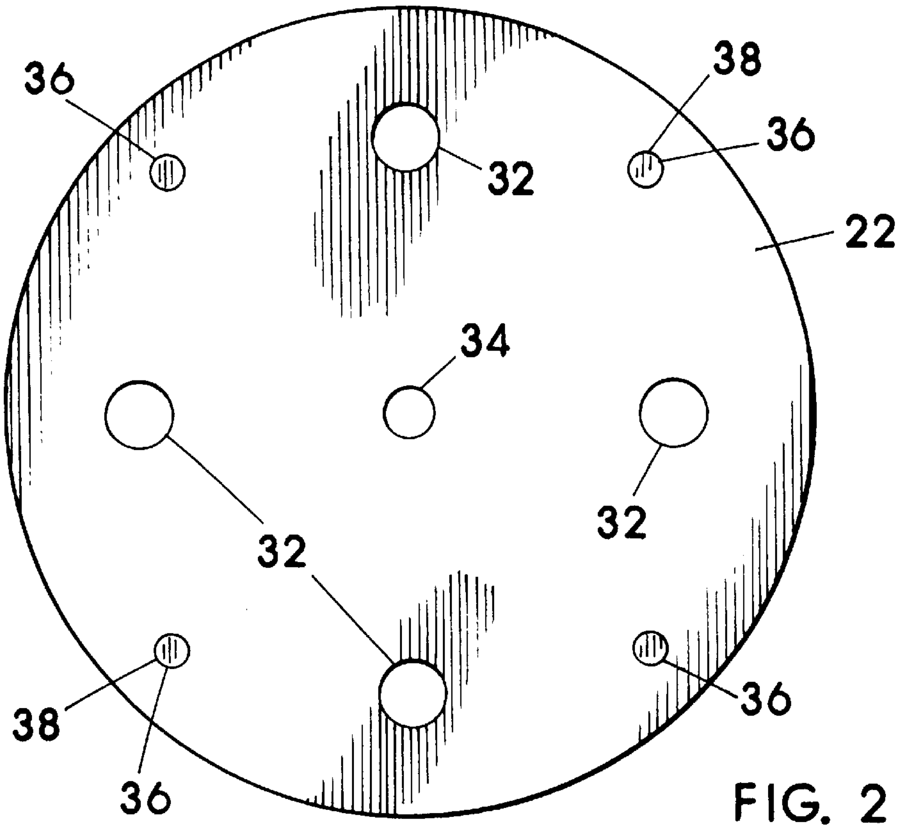
FIG. 2 is a bottom side view of a slightly moveable force applicator member.

In FIG. 1 the lower end of arm 16 is position within the confines of base 18 and includes a slightly moveable force applicator member 22 connected thereto or engaged therein. Force applicator member 22 in FIGS. 1–2 is a plate-like member including a central upper sleeve or hole 34 into which is inserted the lower end of spring 28, although other suitable connections could be used. The engagement between force applicator member 22 and spring 28 is tight so as to eliminate excessive play therebetween. Force applicator member 22 extends outward laterally relative to the lengthwise axis of arm 16, and in this example extends laterally in four directions, and holds four disks or small members of compression-sensitive variable-conductance material 36 (CSVC material) which in this example are each in thick disk or rod form and held to force applicator member 22 by being partly inserted into bores 38 in the member 22 and being partly exposed so as to be engagable across two conductive leads or a pair proximal circuit elements 40 of circuitry. In this example bores 38 each include a hard ceiling against which the tops of the disks of CSVC material 36 abut, the bottom of the material disks being exposed adjacent an associated pair of proximal circuit elements 40, one pair of proximal circuit elements 40 per disk of CSVC material 36. The CSVC material 36 members could be retained to force applicator member 22 with adhesive, snap-fit or attached to an adhered membrane or with any other suitable arrangement including being mounted atop the proximal circuit element pairs 40 and not carried by the force applicator member 22. The use of separate or independent sensors spaced from one another provides for ease in detecting which of the sensors is activated.

Joystick 10 allows arm 16 to be displaced bi-directionally along two orthogonal axes typically referred to as X and Y axes, as is common with joysticks, possible combined movements along these axes are also allowed to indicate angular combination of the X and Y axes. In other words, arm 16 is moveable in four primary directions, such as left and right, and forwards and backwards, and CSVC sensors 42 are placed for such, with possible combinations such as forward and to the left, or backwards and to the right, etc, being read by combining activation of two of the primary direction sensors. Therefore the four CSVC material 36 members (disks) as indicated in FIG. 2 are located on force applicator member 22 relative to orthogonal X and Y axes, in spacing relative to one another which is equal-distant, and also substantially outward from the center lengthwise axis of spring 28 (arm) intersecting force applicator member 22, which in the example shown is orthogonal to the X and Y axes.

Figure 6:
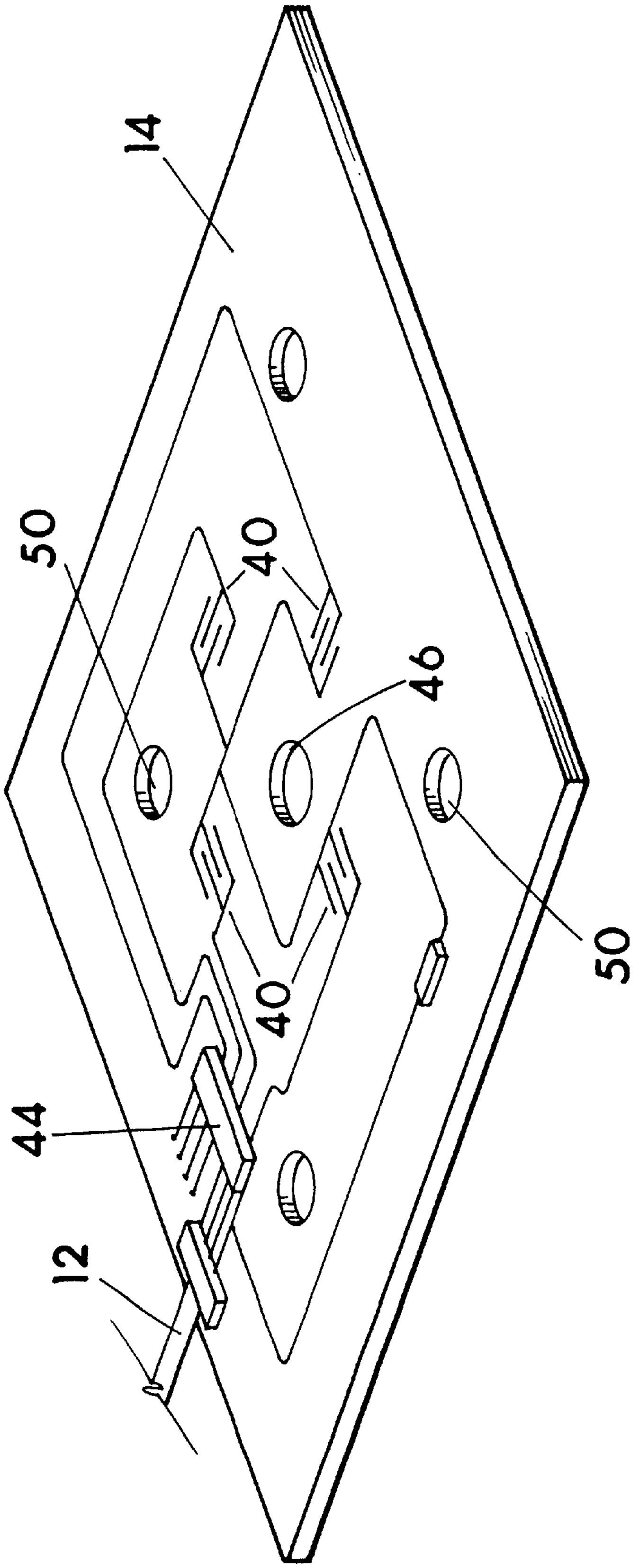
FIG. 6 is a top view of a circuit board.

The CSVC material 36 members lay over and adjacent the associated pair of proximal circuit elements 40, the two elements of a pair 40 being electrical conductors of an open circuit having a difference of voltage potential, the opening between the pair of elements 40 being adjacent the associated disk of CSVC material 36, and the disk or member of CSVC material 36 being positioned to span across the opening of the element pair 40 and close the circuit in a variable electrical manner since the CSVC material 36 is variably conductive depending upon the magnitude or amount of compressive force applied to the material 36. FIG. 6 shows circuit board 14 having four space apart or separated proximal circuit element pairs 40 each comprising interdigitated circuit elements each including a leg connected, directly or indirectly to a microcontroller 44 mounted on circuit board 14 and used for processing the analog data from the sensors. Also shown is a center hole 46 through the board 14 for allowing passage of wires 48 therethrough, such as from electrical sensors 76 in handle 24 as seen in FIG. 1 which will be described further below. Also shown are four holes 50 through the circuit board 14 for partial passage of screws or like fasteners 52 into posts 54 also to be further detailed below.

CSVC material 36, as will be described below later, can have variable capacitance, however I prefer the material 36 to be variably resistive based upon applied compressive pressure so as to act as a variable resistor and spanning across the opening of the associated pair of proximal circuit elements 40. A pair of proximal circuit elements 40, and an associated CSVC material 36 member are herein considered a sensor 42. A sensor 42 is used for forward, another for backward, another for right, and a fourth sensor for left. Two sensors can be under compression (activated) at once for angular directions as mentioned above. In the joystick embodiment 10 as indicated in FIG. 7, force applied to arm 16 causes high displacement of the upper or exposed portion of arm 16 and some displacement in a lower amount in the lower end of arm 16 where force applicator member 22 is engaged, the displacement at the lower end or arm 16 causes rotating or tilting of force applicator member 22 in the same direction as the upper end of arm 16, but in a disproportionate lessor amount due to the movement restrictive aspects of the CSVC material 36 against which the hard surface of force applicator member 22 is abutted, and due to the connection or linkage of the force applicator member 22 and the upper or exposed end of arm 16 via spring 28 or an equivalent resilient member. Force applicator member 22 when under such force presses the CSVC material 36 associated with that particular direction against the firmly or hard backed pair of proximal circuit elements 40 associated therewith, wherein the electrical resistivity of the circuit declines due to the declining resistivity of material 36 allowing additional current flow from one circuit element of the pair 40 through a portion of the CSVC material 36 member and into the other circuit element of the pair 40. The electrical resistivity of the CSVC material 36 declines with increasing compressive force applied. Spring 28 being resilient allows the upper end of arm 16 to continue to be increasingly displaced with increasing force applied to arm 16, however, force applicator member 22 is in large part restrained against an equal amount of tilting displacement relative to the upper end of arm 16 due to the firmness of the CSVC material 36 member(s) sandwiched between force applicator member 22 and the circuit board 14 supporting the circuit elements pairs 40 (and the hard surfaces thereof), the circuit board 14 in this case being rigid and serving as a backing member among other functions. Because spring 28 has a bending resistance curve or increasingly resists further bending (flexing) as it is increasing bent from a resting position, and is intentionally selected to have such load curve, the greater the displacement of arm 16 from the resting position, the greater the resistance to further bending by spring 28 is inherent, this increasing resistance to spring 28 bending equates to increasing force transferred against the CSVC material 36 member (sensor) under compression. This increasing force transfer provides increasingly lower electrical resistance across the associated circuit element pair or pairs 40 brought about by the increasing compressive force applied to the associated CSVC material 36. The flexible and resilient nature of spring 28 also clearly provides for a disproportionate tilt displacement of arm 16 relative to the force applicator member 22, since as the force applicator member 22 is increasing restrained against displacement in a sensor compressive movement toward circuit board 14 due to the firmness of the CSVC material 36 and the abutment thereof against the circuit element pair 40 on the rigid circuit board 14, the upper end of arm 16 can clearly be further readily displaced, being moved against the resistance force of spring 28. Spring 28, along with other components such as the strength of circuit board 14 should be selected so that too much (damaging levels) force cannot be applied to the sensors or the circuit board in this particular arrangement. Therefore, in this situation, the "compression applicator" primarily comprises the force applicator member 22 and the circuit board 14, between which the CSVC material 36 is compressed when force applicator member 22 is moved (rotated, tipped, tilted) toward circuit board 14, proximal circuit element pairs 40 and CSVC material 36 thereon.

The spring 28 of arm 16 allows continued displacement of arm 16 with increasing force applied thereto, the increasing displacement of arm 16 bringing about increasing force against the CSVC material 36 under compression, the force applicator member 22 while still technically being displaced in small amounts further toward circuit board 14 in a compressive movement is not being displaced in a proportionate amount relative to the displacement of the upper or exposed region of arm 16 since spring 28 is bending, again see FIG. 7. In other words, displacement of arm 16 results in displacement of force applicator member 22, but the displacement of force applicator member 22 is less and disproportionate relative to the displacement of arm 16, particularly displacement of the upper end of arm 16.

The varying resistance across the pairs of proximal circuit element 40 can be used as analog information indicative of the magnitude of force applied to arm 16, and the particular sensor(s) associated with a particular direction of force when activated indicates the particular direction of the force applied to arm 16 since the sensors are positioned in association with directions (X and Y axes). Combined sensor activation indicates angular force applied to arm 16, angular to the four primary directions.

As those skilled in the art understand, such analog information can be ready given bit assignments and converted to digital information, the digital information including therein information representational of the direction of the force applied to arm 16, and the amount or magnitude of force applied to displace the arm 16, with such information being useful in many ways including for moving a pointer or any controllable object or portion thereof showing on a display in a given direction and at a given velocity if desired, or manipulating graphical images and game and computer programs and the like. The analog information from the sensors can be routed (circuited) for use or for processing such as in microcontroller 44 prior to use by end-use electronics, in which case it will usually be converted to digital information and can be sent to a host or electronics (end-use electronics) to be controlled. The processed output from the present joystick can be USB compliant data (universal serial bus) for direct input into a modern USB socket or the like of a computer. The use or output of USB compliant digital data such as from microcontroller 44 is quite advantageous in rendering the present joystick capable of readily communicating with a modern computer with USB input port. Furthermore, if a microcontroller such as 44 is being purchased and installed in the joystick for reasons other than providing USB compliant information output, it essentially costs nothing more to program the microcontroller to output USB complaint digital data so as to gain the many benefits thereof. Included herewith as reference material which constitutes prior art is a USB manual titled: Universal Serial Bus (USB), Device Class Definition for Human Interface Devices (HID), Firmware Specification-Oct. 14, 1998, Version 1.1 draft, which was printed from the Internet site of www.usb.org in Nov. of 1998, the site also having additional information on USB specifications and tables which may be of assistance to the reader.

In the example of FIG. 1, force applicator member 22 is restrained against significant lateral movement, and against axial rotation so as to maintained the alignment of the CSVC material 36 members with their respective proximal circuit element pairs 40. In the example shown, such alignment is maintained by way of multiple stationary posts 54 depending from the top interior surface of base 18 and passing through holes 32 in force applicator member 22. Holes 32 could instead be edgeward notches as in FIG. 5 or other suitable arrangements. The posts 54 through holes 32 arrangement in this example also serves to hold the lower end of arm 16 generally centered within opening 20 in the normal resting position, an arrangement which allows arm 16 to be bent and displaced with force applied to its upper end, and further to automatically return to the resting position (and electrical center null) with removal of the displacing force. The posts 54 through the holes 32 in force applicator member 22 are sufficiently loose fit to one another to allow for the tilting of the force applicator member 22 upon displacement of arm 16 as discussed above, thereby allowing the application of compressive force against the sensors. Other axial rotation preventing structures can of course be used within the scope of the invention.

Figure 3:
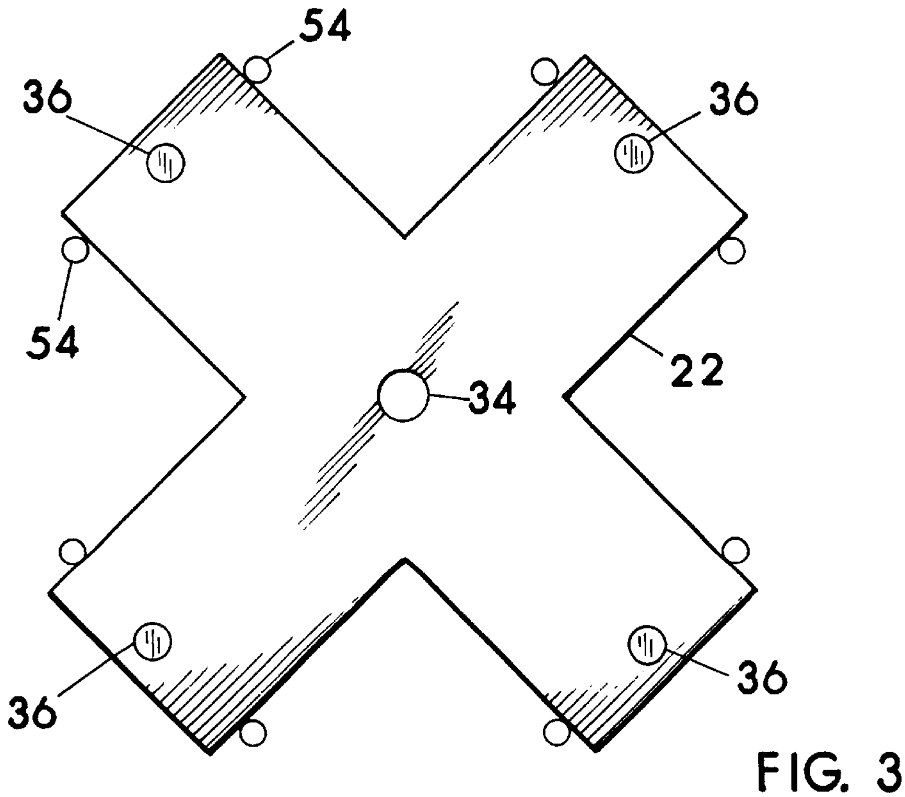
FIG. 3 shows an alternative shape of force applicator member.
Figure 4:
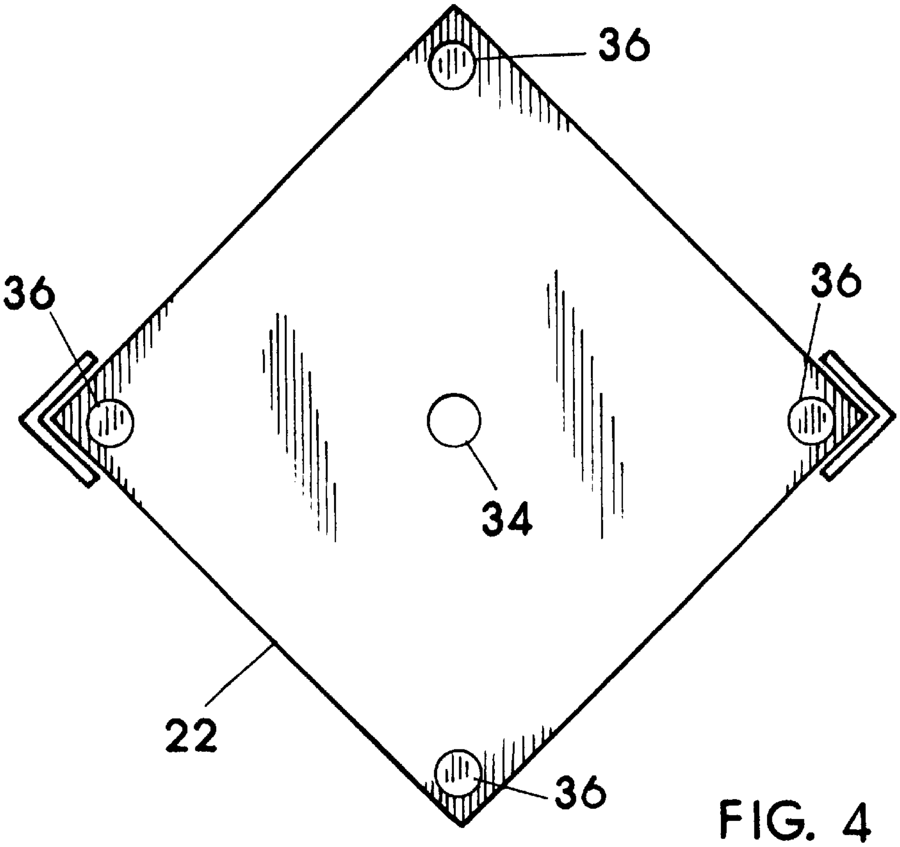
FIG. 4 shows another alternative shape of force applicator member.
Figure 5:
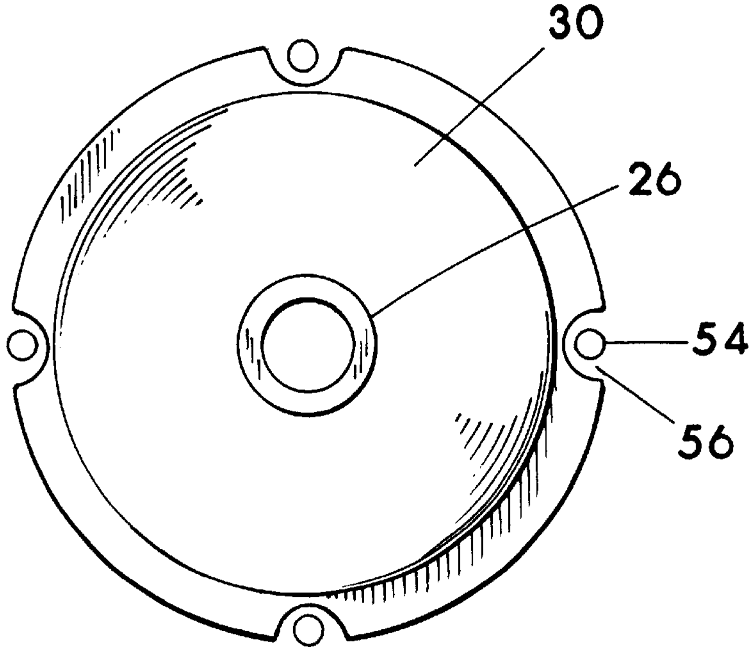
FIG. 5 shows from a top view, a spherical member with center stem portion shown in the FIG. 1 side view.

FIG. 2 is a bottom side view of the slightly moveable force applicator member 22 of the embodiment of FIG. 1. FIG. 3 shows an alternative shape of force applicator member with the posts 54 positioned to the outer periphery instead of passing through holes. FIG. 4 shows another alternative shape of force applicator member and including 90 degree corner members as anti-axial rotation providers.

Also, in the example shown in FIG. 1 are posts 54 being utilized to support circuit board 14, the specific example being one wherein posts 54 include threaded bores in the lower terminal ends thereof for receiving fastener screws 52 used to secure circuit board 14 stationary to the bottom ends of the posts 54. As can be better understood from both FIGS. 1 and 5, posts 54 pass through loose fit notches 56 (see FIG. 5) in the outer periphery of the semi-spherical member 30 to restrain member 30, stem 26 from unwanted excessive axial rotation while still allowing sufficient tilting for operating the compression applicator. The restraining of stem 26 against axial rotation is particularly useful when a rotatable handle 24 is applied thereto as will be detailed later below.

The normal resting position of arm 16 corresponds to an electrical null position (mentioned above) wherein none of the compression-sensitive variable-conductance sensors for detecting force against the arm 16 are activated, i.e., under significant compression or read as such by the circuitry and microcontroller 44 on circuit board 14. If the CSVC material 36 members all rest normally upon their respective circuit element pairs 40 as shown in joystick embodiment 10, then conductivity across the element pairs 40, if any, and the material 36 can be mixed to differing levels of sensitivity, would be low and can be disregarded by the microcontroller 44 or the like and treated as an invalid signal and not indicative of intentional force applied to arm 16 by the user. Any increase to one or a possibly combined pair of sensors beyond this center electrical null would be treated as an intentional activation of the sensors and the microcontroller would produce data appropriate to such for conveying to host or additional electronics such as in a computer, game console or the like. From the normal resting position of arm 16 correlating to the center electrical null position, even a slight amount of force applied to displace arm 16 causes compressive movement in the compression applicator arrangement against one or more sensors to cause a change or manipulation of the electricity of the circuitry which is routed to the microcontroller 44. Thus, due to the preferred lack of any appreciable spacing or gap between the CSVC material 36 and the rigid surfaces of associated proximal circuit element pair 40 and force applicator member 22 when arm 16 is in the normal resting position and the controller is in the center electrical null position, slight displacement is read, and thereby the electrical response is or at least can be immediate with slight displacement of arm 16, and thus high sensitivity is or can be achieved. In FIG. 1 in broken lines is an optional central pivot member 47 on which force applicator member 22 can pivot, the member 47 could have a central hole therethrough and align with the bore center of spring 28 and 46, however I find the pivotal structure to not normally be needed.

Also shown in FIG. 1 are tilt limiting posts 58 shown depending from the upper interior of base 18 and extending downward to terminate just above the upper surface of force applicator member 22. When four CSVC sensors 42 are used, four posts 58 can be used, the terminal ends of the posts 58 positioned closely adjacent a CSVC sensor 42, one post 58 per sensor 42, the optional posts 58 serving the function of preventing the adjacent surface of force applicator member 22 from rising beyond a predetermined point as the member 22 is tilted, which I have found that in some but not all circumstances aids in forcing the lower or lowering side or edge of the force applicator member 22 directly across from the engaged post 58 more firmly downward in compressive movement against a CSVC sensor or sensors 42 associated with the particular direction of displacement of arm 16. It should be noted that the CSVC material 36 members (disks) do not need to be "carried" by the force applicator member 22, as they can be located or adhered directly on the proximal circuit element pairs 40 whether on the circuit board below force applicator member 22 or whether the proximal circuit element pairs 40 are on the underside of force applicator member 22 with connecting wires extending therefrom to the circuitry such as on circuit board 14 having microcontroller 44 for example, and possibly in combination with the CSVC material 36 members mounted on resilient members or portions of or on circuit board 14 or another board or the like to provide attenuation and allow force applicator member 22 and arm 16 whether rigid or elastomeric in whole or in part to allow arm 16 to still be displaced a significant amount by the user without compressive force being generated with the compression applicator arrangement to such as level as to damage components.

Further, as shown in FIG. 1, spring 28 is a coiled tension type spring, such as a metal tension spring for example. Such a tension spring having helical and tightly stacked coils wherein the coils rest engaged one upon the other as shown, has been discovered by myself to reduce arm vibration and false triggering of the sensors, such vibration or wobbling potentially occurring from the bent and thus loaded spring 28 being released by the user when spring 28 is still bent or loaded, wherein the spring arm 16 returns and overshoots the center null position and briefly activates a sensor or sensors 42. This would be a more common occurrence with an arm 16 having greater length or weight at its upper end, such as if it had a grippable handle attached thereto. I have discovered that a tightly wound or stacked and engaged coiled tension spring is generally self-dampening, and thus greatly reduces or eliminates the wobbling/vibration and false sensor triggering.

Also shown in FIG. 1 is a user selectable and settable electrical control device arranged for or intended to be a throttle control 60 for simulating throttle or the like settings associated with electronic games or the like simulations wherein gas or fuel or the like is set by the user, often determining operating speed of a simulated character such as a car, boat or the like. The electrical component 62 of the throttle control 60 can be a potentiometer or other electrically variable device (which can be set for constant electrical output) connected to an exposed knob (the term knob includes a wheel) available to the user external of base 18, the electrical component 62 within base 18 connected by wiring 64 to circuit board 14. I have made a settable throttle control using CSVC material 36 in a sensor with a pair of proximal circuit elements positioned within a compression applicator which included settable ramping such as threads on a rod within a stationary thread-carrying bore such as a nut for moving the end of the threaded rod toward and away from the CSVC material 36 via rotation of the knob attached to the opposite end of the rod. The end of the rod can be adjustably positioned a distance from the backing member of the sensor for applying compression to the sensor (CSVC material 36) and maintaining the compression force until the user selects, by way of rotatably adjusting the ramping for move or less compression, another setting for the throttle. Generally without regard to the particular structuring, throttle devices on game and computer peripheral devices such as joysticks, the present throttle control not being an exception, allow the user to set a constant electrical state, and adjust the state when desired.

Figure 8:
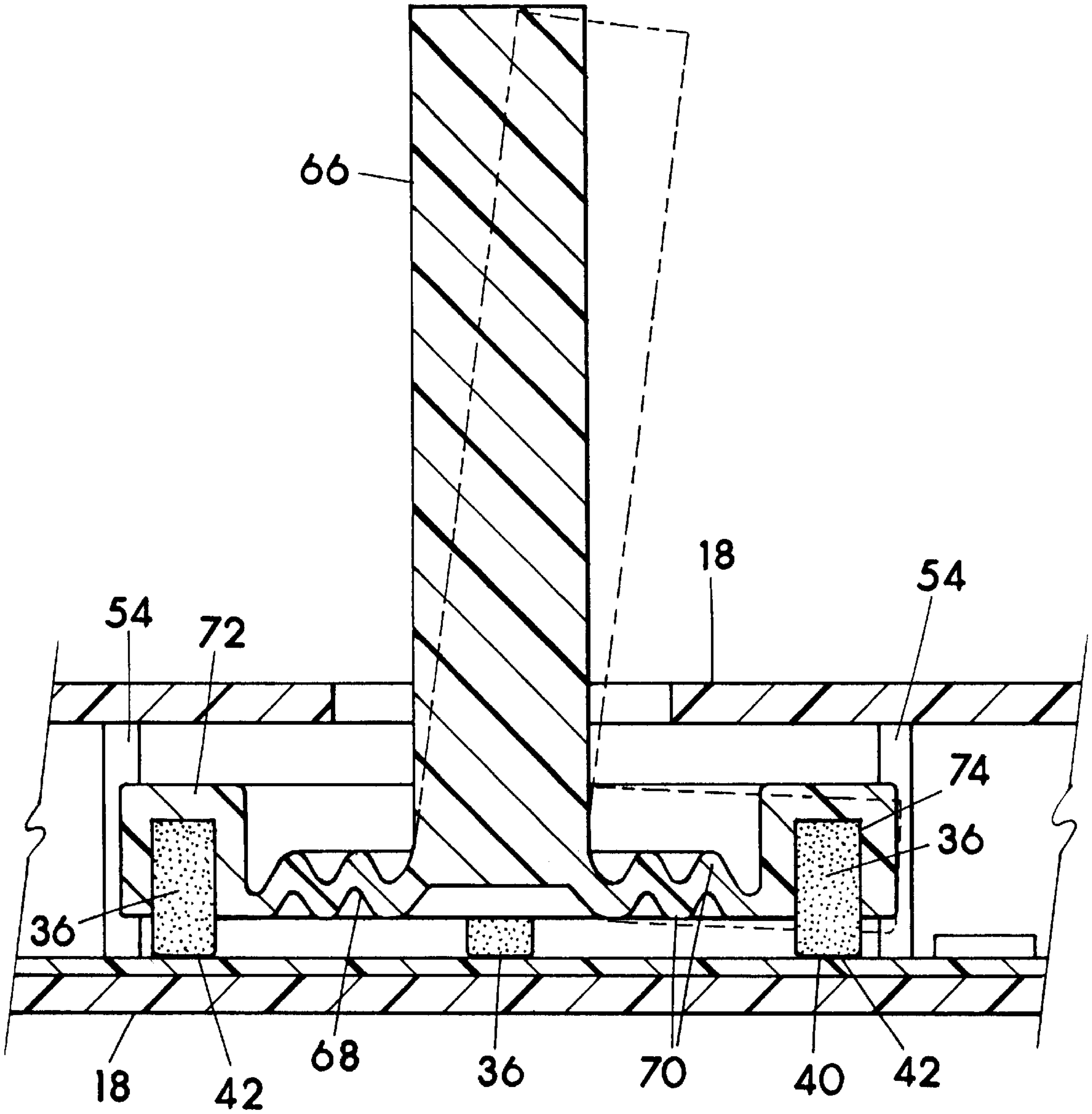
FIG. 8 shows, in a side view, another embodiment of arm with force applicator member in a portion of the base or housing cut-away in accordance with the invention.

FIG. 8 shows another embodiment of elongate lever arm, spring (resilient member or means), with a force applicator member which is a perpendicularly extending plate structure useful in a joystick in accordance with the invention and shown in cross section. Elongate arm 66 is substantially radially displaceable from a normal resting position which preferably equates to an electrical null position. Elongate arm 66 is shown attached at one end thereof to an annular thinned spring plate 68 portion of resilient structuring extending laterally outward relative to the lengthwise axis of arm 66; the thin material spring plate 68 further shown having optional annular convolutions 70 concentric to the axis of arm 66, the convolutions 70 (one or several can be applied) providing a larger amount or longer length of material in which flexing can occur for allowing tipping of arm 66 relative to outer edging 72. The convolutions 70 should also make for a longer lasting structure compared to a flat spring plate 68. On the outer periphery of the spring plate 68 is a fairly stiff material annular edging 72 having holes 74, such as four equalling spaced holes 74, for holding CSVC material 36 members such as in disk, rod or pill form and each at least in part exposed and positioned adjacent (in use) an associated pair 40 of proximal circuit elements for defining CSVC sensors 42. The holes 74 each have a ceiling (preferably a hard ceiling) for allowing compression of the sensor CSVC material 36 against proximal circuit element pairs 40. Although the proximal circuit element pairs 40 are indicated but not clearly shown in this drawing FIG. 8, clearly a circuit board such as circuit board 14 of FIG. 6 can be used to provide the proximal circuit element pairs 40, as well as a housing or base such as base 18 of FIG. 1 in this FIG. 8 illustration. The CSVC material 36 members can be retained in position through any suitable arrangement and the use of holes 74 is not required. Spring plate 68 and the thickened or stiffened edging 72 are inexpensively molded as a single unit or structure of plastics, such as of an acetal for example, and arm 66 can be attached thereto in a secondary process, or arm 66 is molded with spring plate 68 and edging 72. Arm 66, spring plate 68 with or without convolutions 70 and stiffened edging 72 could all be very inexpensively integrally molded as one piece of plastics, such as of an acetal type plastics or of plastics sold under the trademark of "Delrin" by the Du Pont company of Delaware, USA for example only, as other plastics could be utilized, but acetal based or type plastics can be used to make long lasting spring or resilient objects. The thin plate spring 68 portion with or without convolution(s) 70 is again structured by way of shape, material or both, to have a load curve providing increasing resistance to bending or flexing such that increasing displacement of arm 66 results in increasing compressive force applied to sensor 42 (by edging 72) so that the amount or magnitude of force applied to the arm 66 by the user can be read, in addition to the direction since at least four sensors 42 are used, three members 36 shown in FIG. 8 with one missing due to the cross sectioning. The plastics type in combination with the arm 66 and plate 68 structuring (whether convoluted or not) should be such that arm 66 can be forced to angle substantially relative to edging 72 (force applicator member) as indicated in broken lines in FIG. 8, thereby allowing the actuator structure to allow the use of the firm CSVC material 36 in sensors 42 while still providing the user with an arm 66 which is substantially radially displaceable, and detectably so by the user, and which returns under inherent resiliency provided by spring plate 68 to the normal resting position and electrical null position upon removal of the displacing force. The one-piece plastics spring plate 68 and edging 72 can take other physical shapes from that shown in FIG. 8 within the scope of the invention, and are not required to be annular, or thicker or thinner relative to one another, among other possible differences well within the scope of the invention. For example, integrally molded spring material plastics could also be applied outward to and of stiffened edging 72 with the outer spring material connected to the housing or base material or to a stiff mounting plate of the same plastics material which is then mounted to the housing or base 18 in a manner wherein at least a portion, such as the upper portion, of the arm 66 is exposed to receive applied force from the human user, this arrangement in effect would allow the economical molding of the arm 66, spring(s) 68 (and outer spring) and stiffened edging 72 (which may not be edging at that point) as an integral molded component of base 18 or a portion of base 18. From one viewpoint in reference to the FIG. 8 structural arrangement, the edging 72 can be viewed as the slightly moveable force applicator member, the resilient spring plate portion 68 with or without convolutions 70 as the resilient member connecting, linking, engaging or interconnecting between the arm 66 and the slightly moveable force applicator member. Also shown in FIG. 8 is a housing or base 18, or at least portions thereof are shown, the bottom inside surface of the base 18 supporting and being a firm backing member to a circuit board the same or equivalent to circuit board 14 which is the backing member for the proximal circuit element pairs 40 of the sensors 42. Also shown is the circuit board having a micro-controller mounted on the right side thereof, such as for digital or USB compliant data output from the joystick. The top inside surface of the base 18 is shown in close proximity to the adjacent upper surface of the stiff edging 72, but with some spacing therebetween, an arrangement which with the tipping of the force applicator member with force applied to the upper exposed portion of arm 66, the base abuts and serves to prevent the edge 72 from moving upward beyond a predetermined amount which has the effect of directing in an improved manner force downward against the sensor 42 straight across from the abutment, as described above in reference to tilt-limit posts 58 in FIG. 1. Arm 66 is shown exiting base 18 through a relatively large hole in the base which could be covered with a sliding or tilting plate structure or rubbery boot if desired, or spring plate 68 could in effect be molded over the hole as described above with arm 66 exposed and the CSVC sensors 42 protectively enclosed by the base. Also shown in the FIG. 8 embodiment are anti-rotation posts 54 depending from the upper inside surface of base 18 and in this case illustrated as to be partly within side notches in the force applicator member, as opposed to holes therethrough which could be used, the side notches being similar to those shown in FIG. 5, and the post 54 and notch arrangement being just an example of preventing the axial rotation of the force applicator member (edging 72) to the extent that the CSVC material 36 members would become misaligned with their associated proximal circuit element pairs 40. The FIG. 7 principle of the lever arm (arm 66 in FIG. 8) being tiltably displaceable X degrees resulting in the force applicator member (edging 72 in FIG. 8) being tiltably displaced less than X degrees due to the abutment thereof against firm CSVC material 36 and the flexibility of the spring member (68 in FIG. 8) linking the arm to the force actuator member is basically equivalent for the FIG. 8 structural arrangement. By having the edging 72 change very little in tilt angle relative to sensors 42 even when arm 66 is greatly tilted (changed in tilt angle) by force, the application of force to the sensors 42 is always generally in the same direction and location, for example straight onto the sensors without regard to the angle of arm 66, and this provides more predictable force application and thus electrical information output compared to if the plate or stiffened edging 72 were changed from a low angle such as to be angled (tilted) steeply with a steeply angled arm 66. A steeply tilted edging or like press plate, i.e., one which varies significantly in angle relative to the proximal circuit element pairs 40 or the CSVC material 36 members, applies force to differing locations of the sensor with different angles thereof, which is generally less effective, and this principal is also true in the other joystick embodiments herein described, particularly the FIG. 1 embodiment 10 joystick.

With reference now to FIGS. 9–13 wherein a force detecting sensor arrangement using compression-sensitive variable-conductance sensors 76 of principally the same structure as CSVC sensors 42 are applied for detecting axial rotation of one member relative to another, such as in handle 24 of joystick 10 for sensing rotation about a Z axis or yaw (stem or spring), the direction of rotation and magnitude (amount) of force applied, or in axles 78 of a joystick embodiment 80 which uses a gimbal or double gimbal arrangement, the sensors 76 for sensing direction of rotation of the axles 78 and amount of force applied to the joystick lever arm 82. Such a sensing arrangement can also very economically be used for other axially rotatable members such as those associated with steering wheels for electronic games or the axles or pivot points of foot pedals used for gas, brake or rudder control in electronic games and the like with computers and game machines/consoles, so as to provide analog information pertaining to such rotation.

Figure 9:
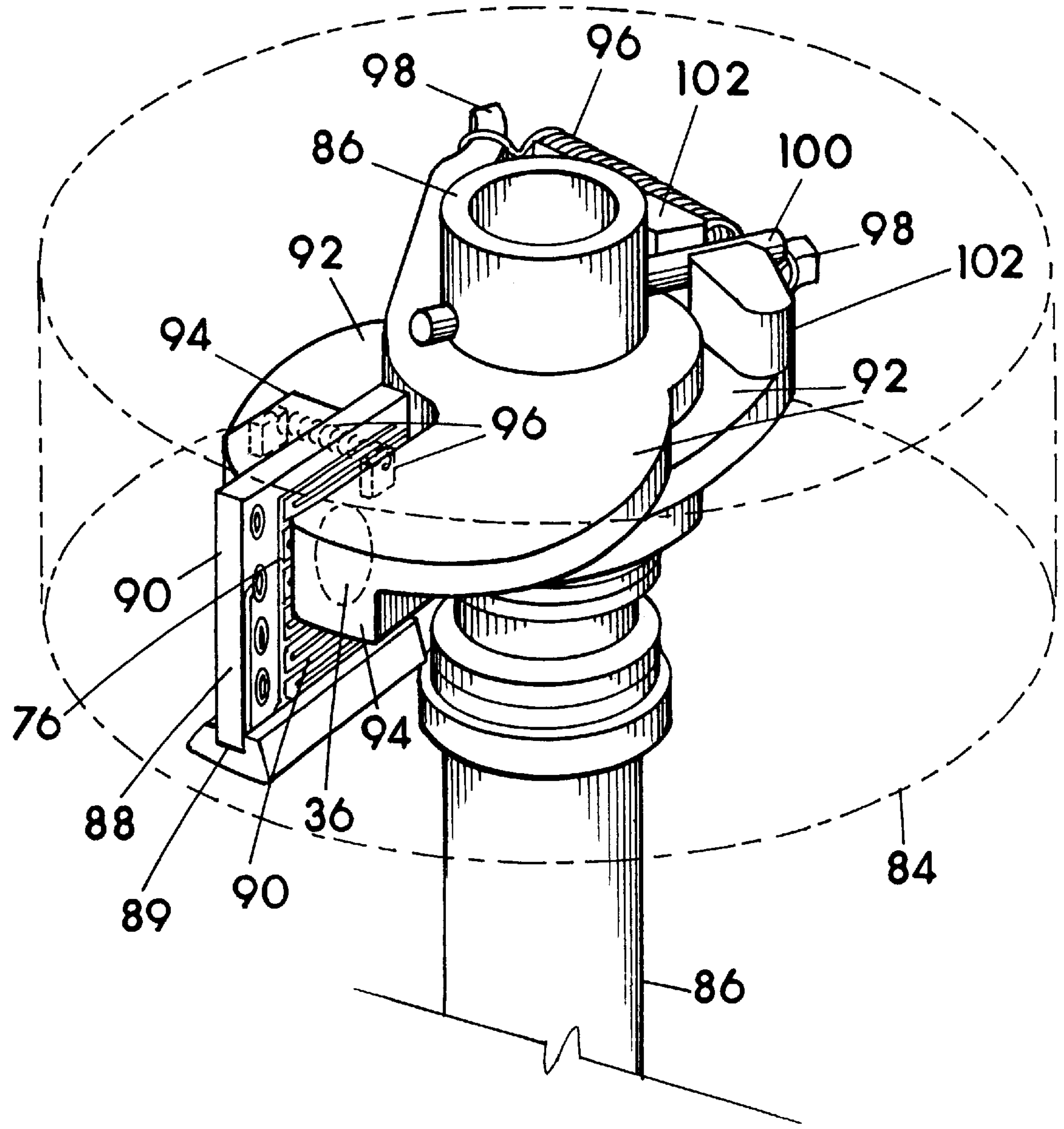
FIG. 9 shows a shaft having two spring loaded opposing actuator arms with opposing surfaces of the rotatable actuator arms resting adjacent two compression-sensitive variable-conductances sensors as can be used on a rotatable handle or axle of a joystick.
Figure 10:
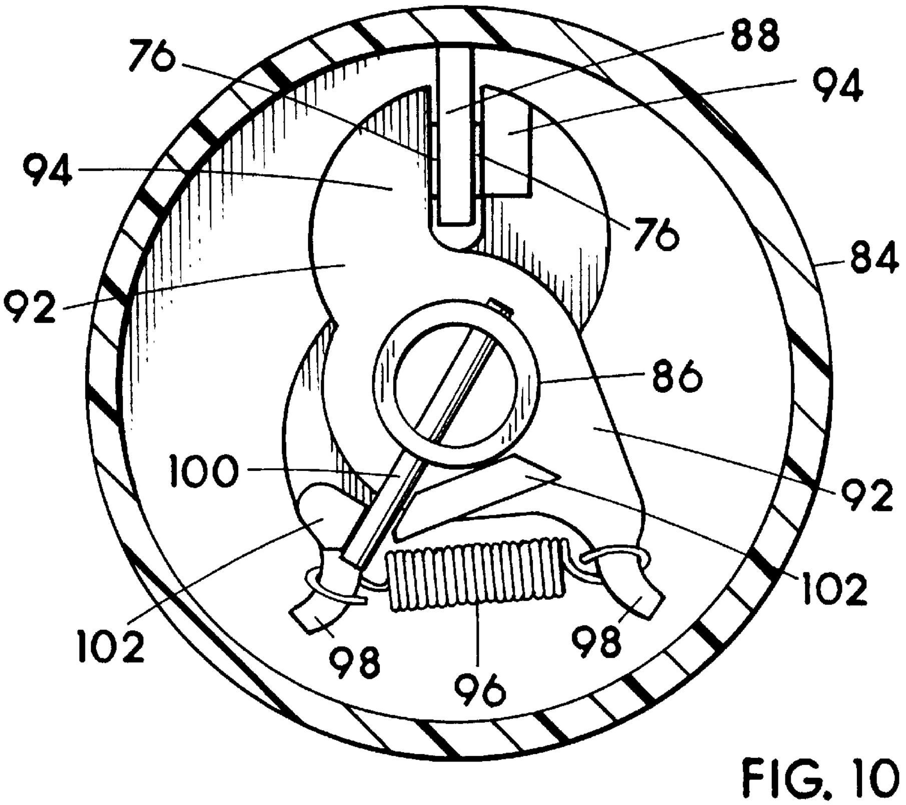
FIG. 10 is a top view of the assembly of FIG. 9 at rest.
Figure 11:
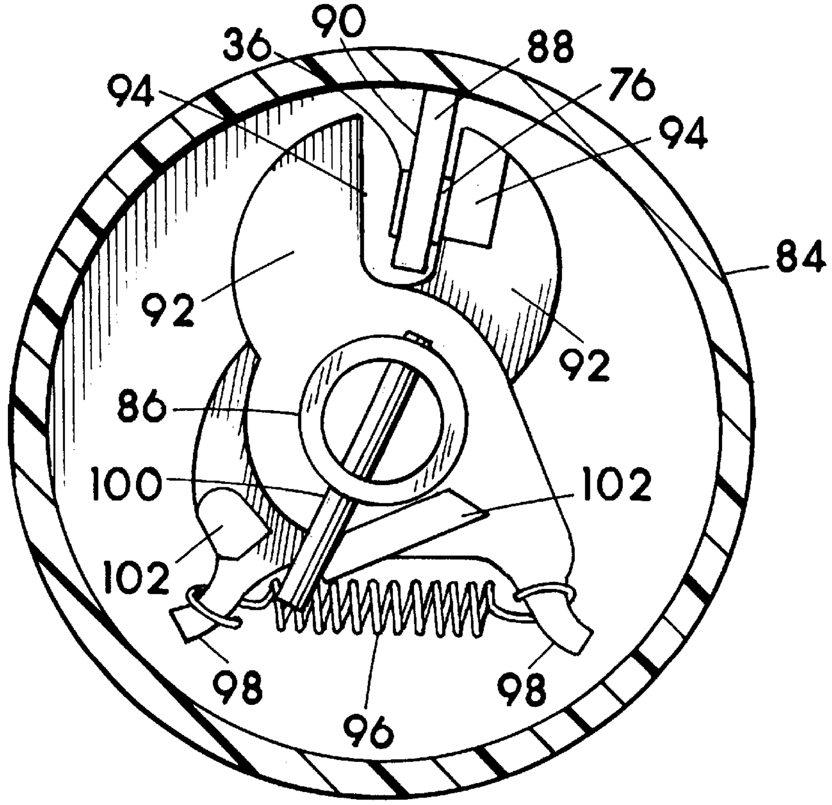
FIG. 11 is the FIG. 9 assembly with rotation occurring.
Figure 12:
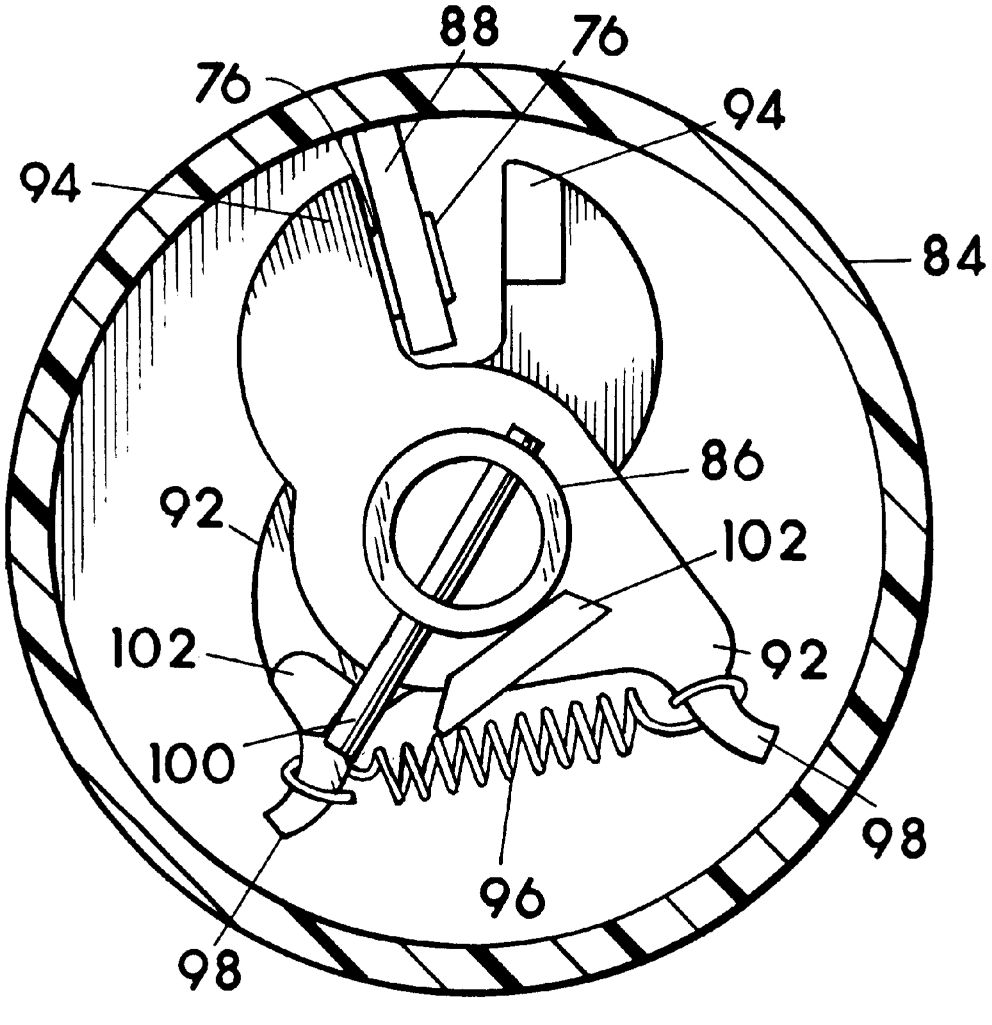
FIG. 12 is the FIG. 9 assembly with rotation occurring in an opposite direction from FIG. 10.
Figure 13:
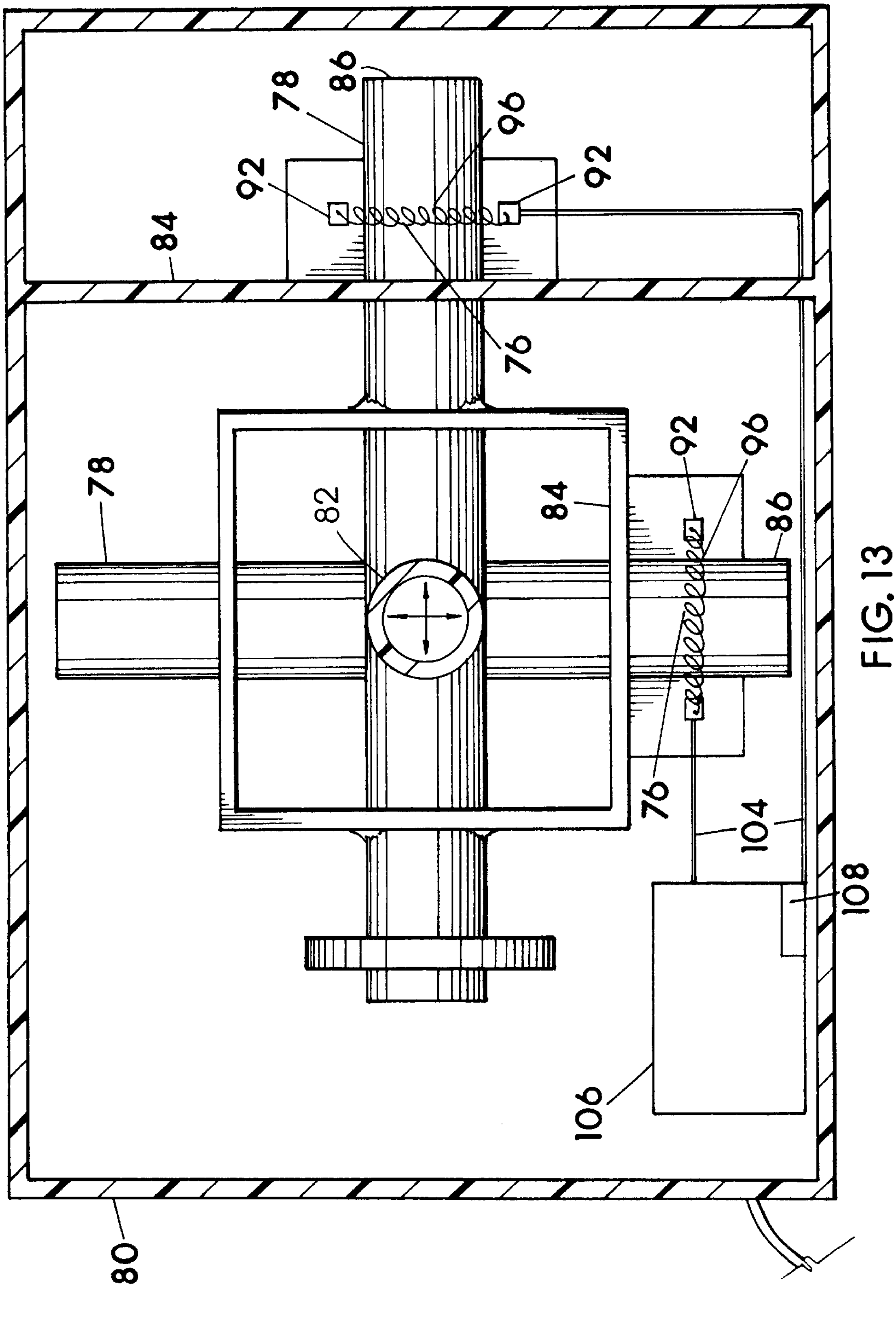
FIG. 13 is illustrative of a top view of a gimbal type or gimbal using joystick with compression-sensitive variable-conductance sensors in accordance with the invention. The upper portion of the housing or base is removed by sectioning to show internal components.

Shown in FIGS. 9 and 10 is outer casing 84 which is the outer grippable portion of handle 24 of FIG. 1 in this description portion and which is rotatable relative to the stem or shaft 86. Shaft 86 can be stem 26 of FIG. 1. Casing 84 in reference to gimbal joystick embodiment 80 of FIG. 13 is a housing or walling portion for mounting at least a portion of the CSVC sensors 76 for detecting axle rotation, wherein casing 84 is stationary relative to axle or shaft 86 which is rotatable. Shaft 86 in reference to joystick embodiment 80 is an axle 78 of the gimbal structure. The description will now proceed as though the structure is handle 24 of FIG. 1, although it can also clearly be a handle on the arm 82 of joystick embodiment 80. Casing 84 in FIGS. 9–12 is shown supporting a backing member which is this example is a double sided circuit board 88 slipped into a retaining slot 89 or otherwise affixed with each of the two opposite sides of circuit board 88 having a pair 90 of proximal circuit elements exposed thereon for interacting with a CSVC material 36 member, one CSVC material 36 member per each side and per each proximal circuit pair 90 and normally per each possible direction of casing 84 (handle) rotation, i.e., clockwise and counterclockwise. The circuit board 88 (backing member) is this example is rigid and stationary relative to the casing 84 so as to rotate, i.e., orbit about stem 26 (shaft 86 in FIGS. 9–10) when a user grasps and rotates the handle. In FIG. 9, one pair 90 of proximal circuit elements is shown, the other side of the circuit board 88 also includes a pair 90. In this example, the CSVC material 36 members which can be disk or pill form (any suitable shape) are adhered to the proximal element pairs 90, but could be carried by the opposing hard surfaces or jaws 94 of actuator arms 92 adjacent the circuit board 88. A pair of actuator arms 92 are shown, one upper and one lower, each are rotatably mounted on or relative to shaft 86. The actuator arms 92 can be considered to be or equivalent to force applicator member (s). Actuator arms 92 are linked or connected to one another by resilient member or spring 96 which is a tension spring in the example shown in FIG. 9 connected on curved far ends 98 of the arms 92 so as to normally draw the opposing surfaces or jaws 94 toward one another and toward circuit board 88 and CSVC sensors 76. Normally the jaws 94 rest in close adjacency to circuit board 88 as shown in FIG. 9. In FIGS. 11 and 12 where rotation has occurred, it can or will be appreciated that upon relief of the rotational force, the spring 96 via drawing the jaws 94 of arms 92 toward one another with the rigid circuit board 88 therebetween will cause a centering of the casing 84 or provides a return-to-center response for the handle 24 of FIG. 1 (casing 84). Such return-to-center is also provided, as will become appreciated with continued reading, by such a sensor arrangement with spring 96 and arms 92 applied to an axle or the axles 78 of joystick embodiment 80, the return-to-center being the returning of the in-part exposed lever arm 82 of the joystick to a normal resting position much like the CH Products prior art gimbal joystick mentioned above. In FIGS. 9–12, a rod or post 100 is secured to shaft 86, extending outward therefrom, and is stationary relative thereto. Post abutment tabs 102, one tab on each far end of each actuator arm 92 is positioned to normally lay in close adjacency to post 100. As can be seen in FIG. 11, when casing 84 (handle) is rotated clockwise, circuit board 88 moves therewith and one of the CSVC sensors is pressed against the jaw 94 of one of the actuator arms 92 which is the lower arm 92 in this example. The far end of the lower actuator arm 92 is pulled or held to a degree by spring 96 toward the far end of the upper actuator arm 92 as post 100 in effect holds the upper actuator arm 92 stationary relative to shaft 86 by the abutment of post 100 against the tab 102 thereof. The applied tension on spring 96 pulls the jaw 94 of the lower actuator arm 92 in the FIG. 11 into circuit board 88 (sensor 76) whereby compression is applied to the sensor 76 in some measurable relationship relative to rotation (amount) of the casing 84 (handle) relative to shaft 86, the greater the amount of rotation the greater amount of rotational force being required to be applied since the spring 96 is being stretched. Spring 96 attenuates or moderates the compressing force against the sensor 76. In an alternative arrangement, the post 100 (a member of equivalent function) can be positioned near the jaws 94 for abutment with arms 92 in that region instead of on the far of shaft 86. Spring 96 can also be attached to arms 92 and spanning across (above, below or beyond terminal ends the arm 92) in close adjacency to jaws 94 as indicated in broken lines in FIG. 9, again instead of being across or on the far side of shaft 86.

As shown in FIG. 12, rotation of casing 84 (handle) in a counterclockwise direction presses the jaw 94 of the upper actuator arm 92 into sensor activation, the force applied to the CSVC material 36 as with clockwise rotation being attenuated by spring 96 as the spring is placed under tension by post 100 abutting the tab 102 of the lower actuator arm 92 to in effect hold the lower arm 92 stationary. Spring 96 has a resistance load curve, i.e., is increasingly stiff as it is stretched from its resting position, so that greater rotation produces greater force against the particular sensor under compressive force between the jaw 94 and the backing member circuit board 88. Wiring 48 or other suitable conductive circuitry from the proximal circuit elements on the circuit board 88 can lead to circuit board 14 and or microcontroller 44 to deliver the information which identifies which sensor 76 have been activated, which in effect tells the direction of rotation, and because the sensors are analog, i.e., variably conductive relative to or dependant upon applied compression force, how much force at least in relative terms, has been received by the sensor. Again, a disproportionate and lessor rotating displacement of a jaw 94 into or against a CSVC sensor 76 relative to rotation of the greatly or substantially displaceable surface (casing or outer handle surface) against which force is applied by the user occurs, and this again due the linking with a resilient member spring 96 and providing the benefit of being able to use a firm CSVC sensor material 36 with a noticeably displaceable force receiver member, in this situation the casing 84 being the handle grippable surface and being noticeably rotatable. Backing member or circuit board 88 could be resilient to a degree and stops could be applied to limit handle rotation.

When the same basic structural arrangement is applied to an axle of a gimbal utilizing joystick, such as joystick embodiment 80 of FIG. 13, one sensor arrangement per each of the two axles 78, the arm 82 of the joystick 80 can be substantially displaced by user applied force in the exposed area thereof to rotate or radially displace the arm 82 and axially rotate one or both axles 78, depending upon direction of force applied to the arm 82. In FIGS. 11 and 12, shaft 86 can be, for this gimbal axle rotation description, be considered an axially rotatably axle of the gimbal joystick embodiment. The axles 78 rotates upon displacement of the arm 82, and circuit board 88 in effect remains stationary to the housing or base 18 as the axles 78 rotate. In FIG. 11, the axle represented as shaft 86 is or has been rotated counterclockwise, post 100 has rotated with the axle. Post 100 has pushed against tab 102 of the upper actuator arm 92 to rotate the upper actuator arm 92 in rotation with the axle. The linkage of spring 96 between the two actuator arms 92 pulls the far end 98 of the lower actuator arm 92 in a like direction which has the effect of pushing the jaw 94 of the lower arm 92 into circuit board 88 (backing member) and the CSVC sensor associated with that direction of rotation. The actuator arms 92 are moved or rotated in like directions to one another and the axle, and the spring 96 attenuates the force against the CSVC sensor under compression. The actuator arm 92 pressing the CSVC sensor rotates fewer degrees than the axle because of its abutment at the jaw 94 thereof against the firm CSVC sensor and backing member (circuit board 88), and fewer degrees than the highly or user detectable displaceable arm 82, and disproportionately fewer, as the arm of the gimbal joystick can be rigid and rigidly linked to move the axles 78 in a fixed movement relationship. This arrangement allows for arm 82 to be rigid if desired, the axles of the gimbal to be rigid as well as jaws 94, and allows direct rotational linkage of the arm 82 to axle or axles 78 of the gimbal. Rotation of the axle 78 in the opposite direction by rotatably or tiltably displacing arm 82 in an opposite direction is the same but basically reversed from that described above for the first rotation direction of the axle. Also shown in FIG. 13 is conductive wiring 104 leading from the proximal circuit element pairs of the sensors 76 to circuit board 106 having a microcontroller 108 connected thereto, such as for analog to digital conversion, and specifically for output as USB compliant data when built for modern PC computers. A prior art gimbal using joystick is currently on the market in the U.S. and is made by CH Products of San Marcos, Calif., USA, and is sold under the trade name of "Flightstick Pro"While the "Flightstick Pro" uses a gimbal; a highly displaceable lever arm connected to rotate two axles; and includes a post member on each axle which abuts arms similar to the present actuator arms 92, the post, arms and tension spring connected across the arms of the "Flightstick Pro" are only for return-to-center of the lever arm. The "Flightstick Pro" utilizes expensive rotary potentiometers as sensors, one per axle, and requires user adjustable centering wheels to be adjusted by the user at the start of use or play to center the object controlled by the potentiometers. The "Flightstick Pro" does not use compression-sensitive variable-conductance material or CSVC sensors, and while the rotary portion of the potentiometers are mounted to engage the axles near the spring and arms used for return-to-center, the arms and spring of the "Flightstick Pro" are not sensor actuator mechanisms. Handle 24 with the sensors 76 and actuators therefor as described above can be applied to the lever arm of the gimbal type joystick embodiment above described. Additionally, handle 24 can be structured to include a trigger such as for firing, and or a 4-way hat switch (they could also be mounted on the base) which include compression-sensitive variable-conductance sensors or material 36 in an equivalent analog sensor arrangement allowing for example, user variable firing rate or intensity controlled from the trigger, the rate determined by the amount of pressure applied by the user, or the 4-way hat would allow the user to scan right, left, forward or backwards for example, at a rate or degree (angle or amount) controllable by pressure applied to the hat by the user in the direction desired. Such sensors for the trigger or hat switch (or other variable buttons) could be structured like those taught in my U.S. patent application titled VARIABLE-CONDUCTANCE SENSOR filed Jun. 29, 1998, application Ser. No. 09/106,825, or in my U.S. patent application titled VARIABLE-CONDUCTANCE SENSOR WITH ELASTOMERIC DOME-CAP, application Ser. No. 09/122,269 filed Jul. 7, 1998.

From the above it can be understood that the invention is potentially including or is a method of manufacturing a physical displacement to electrical manipulation joystick, and which is, from at least one viewpoint comprising the steps of:

installing within a housing or base, a portion of an elongate tiltable arm member, the arm member normally being in a resting position and tiltably displaceable from the resting position with applied force; a portion of the arm positioned exposed to allow application of force thereto;

installing, within the base, a compression applicator comprising a backing member (circuit board for example) and a displaceable member rotatable toward the backing member in a compressive movement;

installing, between the backing member and the displaceable member of the compression applicator, a compression-sensitive variable-conductance sensor (CSVC material member and proximal circuit elements) located in an electrical circuit for varying electrical conductance through a range (analog or resistive range) dependent upon compressive force applied to the sensor by compressive movement of the compression applicator;

installing means disproportionately linking displacement of the tiltable arm to compressive movement of the compression applicator for providing a disproportionate and lessor amount of compressive movement of compression applicator against the sensor relative to displacement of the tiltable arm. Additional steps or subs-step elements such as installing at least four spaced apart independent compression-sensitive variable-conductance sensors within the compression applicator to receive compression therefrom for generating directional information could be added to the method, but it is believed those skilled in the art will understand the method or methods from this disclosure as a whole.

For the purpose of this disclosure and the claims, "variable-conductance" as the component of compression-sensitive variable-conductance (CSVC) material 36 means either variably resistive or variably rectifying. Compression-sensitive variable-conductance CSVC material 36 as herein used can have either electrical property. Material having these qualities can be achieved utilizing various chemical compounds or formulas some of which I will herein detail for example. Additional information regarding such materials can be found in the R. J. Mitchell patent describing various feasible compression-sensitive variable-conductance material formulas which can be utilized.

While it is generally anticipated that variable resistive type materials for defining CSVC material 36 are optimum for use in compression-sensitive variable-conductance sensor(s) of the present joysticks, variable rectifying materials are also usable within the scope of the present invention.

An example formula or compound having variable rectifying properties can be made of any one of the powdered active materials copper oxide, magnesium silicide, magnesium stannide, cuprous sulfide, (or the like) bound together with a rubbery or elastomeric type binder having resilient qualities such as silicone adhesive or the like.

An example formula or compound having variable resistive properties can be made of the active material tungsten carbide powder (or other suitable material such as molybdenum disulfide, sponge iron, tin oxide, boron, and carbon powders, etc.) bound together with a rubbery or elastomeric type binder such as silicone rubber or the like having resilient qualities. The active material tungsten carbide powder may be in proportion to the binder material in a rich ratio such as 90% active material to 10% binder by weight, but can be varied from this ratio dependant on factors such as voltages to be applied, level or resistance range desired, depressive pressure anticipated, surface contact area between the variable-conductance material and conductive elements of the circuit, binder type, manufacturing technique and specific active material used. I have found that tungsten carbide powder bound with a rubbery or elastomeric type binder such as silicone rubber or the like provides satisfactory results.

Although I have very specifically described preferred structures and best modes of the invention, it should be understood that the specific details are given for example to those skilled in the art, and changes can clearly be made without departing from the true scope of the invention. Therefore, it is understood that the true scope of the invention is not to be overly limited by the specification and drawings given for example, but is to be determined by the broadest possible and reasonable interpretation of the appended claims.

I claim:

1. A physical input to electrical manipulation device, comprising:

a shaft;

two opposing actuator arms rotatably supported on said shaft, said actuator arms each having a jaw portion;

a spring member linking between said actuator arms and sized and positioned as to draw the jaw portions of said actuator arms toward one another and toward a backing member positioned between the jaw portions of said actuator arms;

a pair of compression-sensitive variable sensors each aiming outward from the other, a first one of the sensors positioned between a first one of the jaw portions and said backing member, a second one of the sensors positioned between a second one of the jaw portions and said backing member;

relative movement allowed between said backing member and the jaw portions.

2. A method of manufacturing a physical displacement to electrical manipulation controller, comprising the steps of:

mounting relative to a housing, a tiltable arm member, said tiltable arm member normally in a resting position and tiltably displaceable from the resting position with applied force; a portion of said tiltable arm member positioned exposed to allow application of force thereto;

installing, at least in part within said housing, a compression applicator comprising a backing member and a displaceable member displaceable toward said backing member in a compressive movement;

linking, at least to a degree, said compressive movement to tilted displacement of said tiltable arm;

installing, between said backing member and said displaceable member of said compression applicator, a plurality of individual compression-sensitive variable sensors located in electrical circuitry for varying electrical output through a range dependant upon compressive force applied to any of the individual variable sensors by compressive movement of said compression applicator;

installing means for allowing a significant amount of tilted displacement in said tiltable arm and preventing a damaging level of force from being applied to any of the individual variable sensors.

3. A control device allowing variable physical input to control variable electrical output, said control device comprising;

a housing; extending from said housing is a tiltable arm member; said tiltable arm member supported normally in a resting position and tiltably displaceable from the resting position with input force applied thereto;

means for providing compressive force, upon displacement of said tiltable arm member, against a plurality of compression-sensitive variable sensors, at least one sensor at a time, the plurality of variable sensors located in electrical circuitry for providing variable electrical output indicative of direction of displacement of said tiltable arm member and amount of received compressive force;

means for allowing a significant amount of displacement of said tiltable arm member with applied force, without compressive force being applied to a level as to damage one of the compression-sensitive variable sensors, said significant amount of displacement of said tiltable arm member is the tiltable arm member being tiltable outward at least 10 degrees from said resting position.

4. A control device allowing variable physical input to control variable electrical output, said control device comprising;

a housing; extending from said housing is a tiltable arm member; said tiltable arm member supported normally in a resting position and tiltably displaceable from the resting position with input force applied thereto;

means for providing compressive force, upon displacement of said tiltable arm member, against at least four individual compression-sensitive variable sensors, at least one sensor at a time, the at least four variable sensors located in electrical circuitry for providing variable electrical output indicative of direction of displacement of said tiltable arm member and amount of received compressive force;

means for allowing a significant amount of displacement of said tiltable arm member with applied force, without compressive force being applied to a level as to damage one of the compression-sensitive variable sensors.

5. A control device according to claim 4 wherein said significant amount of displacement of said tiltable arm member is the tiltable arm member being tiltable outward at least 10 degrees from said resting position.

6. A control device allowing variable physical input to control variable electrical output, said control device comprising;

a housing; extending from said housing is a tiltable arm member; said tiltable arm member supported normally in a resting position and tiltably displaceable from the resting position with input force applied thereto;

means for providing compressive force, upon displacement of said tiltable arm member, against a plurality of individual compression-sensitive variable sensors, at least one sensor at a time, the plurality of variable sensors located in electrical circuitry for providing variable electrical output indicative of direction of displacement of said tiltable arm member and amount of received compressive force;

means for allowing a significant amount of displacement of said tiltable arm member with applied force, said means comprising at least one resilient member, wherein said resilient member further aids in preventing compressive force from being applied to a level as to damage one of the compression-sensitive variable sensors.

7. A control device allowing variable physical input to control variable electrical output, said control device comprising;

a housing; extending from said housing is a tiltable arm member; said tiltable arm member supported normally in a resting position and tiltably displaceable from the resting position with input force applied thereto;

structure providing compressive force, upon displacement of said tiltable arm member, against at least four individual compression-sensitive variable sensors, at least one sensor at a time, the at least four variable sensors located in electrical circuitry providing variable electrical output indicative of direction of displacement of said tiltable arm member and amount of received compressive force;

resilient structure at least in part allowing more than 10 degrees of displacement of said tiltable arm member from said resting position.

8. A device converting variable physical input into variable electrical output, said device comprising;

a housing; extending from said housing is a tiltable member, said tiltable member supported normally in a resting position and tiltably displaceable more than 10 degrees in rotation from the resting position; variable physical input displacing said tiltable member causes a holding member to rotate providing pressure against at least one pressure-sensitive sensor of four pressure-sensitive sensors, the four pressure-sensitive sensors located in electrical circuitry providing variable electrical output representing direction and amount of displacement of said tiltable member;

resilient structure in combination with said tiltable member and said holding member, wherein said tiltable member rotates a greater number of degrees than said holding structure.

9. A device according to claim 8 wherein said resilient structure is a spring.

* * * * *